(12) United States Patent
Staniforth et al.

(10) Patent No.: US 10,408,478 B2
(45) Date of Patent: Sep. 10, 2019

(54) HUMIDIFYING APPARATUS

(71) Applicant: Dyson Technology Limited, Wiltshire (GB)

(72) Inventors: Mark Joseph Staniforth, Malmesbury (GB); Daniel James Beavis, Malmesbury (GB); Jude Paul Pullen, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 13/785,787

(22) Filed: Mar. 5, 2013

(65) Prior Publication Data
US 2013/0249126 A1 Sep. 26, 2013

(30) Foreign Application Priority Data

Mar. 6, 2012 (GB) .................................. 1203909.5

(51) Int. Cl.
| F24F 6/14 | (2006.01) |
| F24F 13/26 | (2006.01) |
| F24F 6/12 | (2006.01) |
| F24F 3/16 | (2006.01) |

(52) U.S. Cl.
CPC ................. *F24F 6/14* (2013.01); *F24F 6/12* (2013.01); *F24F 13/26* (2013.01); *F24F 2003/1667* (2013.01); *F24F 2006/125* (2013.01); *Y02B 30/80* (2013.01)

(58) Field of Classification Search
CPC .................. F24F 6/14; F24F 2006/1667; F24F 2003/1667; F24F 13/26; F24F 6/12; Y02B 30/80

USPC ........................................................ 261/141
See application file for complete search history.

(56) References Cited

U.S. PATENT DOCUMENTS

| 284,962 A | 9/1883 | Huston |
| 1,357,261 A | 11/1920 | Svoboda |
| 1,767,060 A | 6/1930 | Ferguson |
| 1,896,869 A | 2/1933 | Larsh |
| 2,014,185 A | 9/1935 | Martin |
| 2,035,733 A | 3/1936 | Wall |
| 2,071,266 A | 2/1937 | Schmidt |

(Continued)

FOREIGN PATENT DOCUMENTS

| BE | 560119 | 8/1957 |
| CA | 1055344 | 5/1979 |

(Continued)

OTHER PUBLICATIONS

EPO and Google translation of over Iwao JP 2003 161473 A published Jun. 6, 2003.*

(Continued)

*Primary Examiner* — Stephen Hobson
(74) *Attorney, Agent, or Firm* — Morrison & Foerster LLP

(57) ABSTRACT

Humidifying apparatus includes a housing defining a water reservoir, and a water tank mounted on the housing for supplying water to the reservoir. An air flow is conveyed over water stored in the reservoir and emitted from the apparatus. The water stored in the reservoir is irradiated by ultraviolet radiation and atomized by a transducer to humidify the air flow passing over the reservoir. A flow of water entering the reservoir is guided adjacent to, and preferably along, the ultraviolet radiation generator.

13 Claims, 16 Drawing Sheets

(56) References Cited

U.S. PATENT DOCUMENTS

| | | |
|---|---|---|
| D103,476 S | 3/1937 | Weber |
| 2,115,883 A | 5/1938 | Sher |
| D115,344 S | 6/1939 | Chapman |
| 2,185,718 A | 1/1940 | Anderson |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,755,106 A | 7/1956 | Brennan et al. |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 2,951,714 A | 9/1960 | Carlberg et al. |
| 2,984,089 A | 5/1961 | Whitesel |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,264,837 A * | 4/1981 | Gaboriaud ............ B06B 1/0253 239/102.2 |
| 4,332,529 A | 6/1982 | Alperin |
| 4,336,017 A | 6/1982 | Desty |
| 4,342,204 A | 8/1982 | Melikian et al. |
| 4,358,080 A | 11/1982 | Wolker |
| 4,448,354 A | 5/1984 | Reznick et al. |
| 4,502,291 A | 3/1985 | Shelton et al. |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,716,946 A | 1/1988 | Grigoletto |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,793,819 A | 12/1988 | Berg |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| 5,071,322 A | 12/1991 | Maekawa |
| D325,435 S | 4/1992 | Coup et al. |
| 5,110,266 A | 5/1992 | Toyoshima et al. |
| 5,114,042 A | 5/1992 | Sutera |
| 5,135,365 A | 8/1992 | Bogage |
| 5,168,722 A | 12/1992 | Brock |
| 5,176,856 A | 1/1993 | Takahashi et al. |
| 5,188,508 A | 2/1993 | Scott et al. |
| D343,231 S | 1/1994 | Lim |
| 5,296,769 A | 3/1994 | Havens et al. |
| D346,017 S | 4/1994 | Lim |
| 5,310,313 A | 5/1994 | Chen |
| 5,317,815 A | 6/1994 | Hwang |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,478,245 A | 12/1995 | Okada et al. |
| 5,483,616 A | 1/1996 | Chiu et al. |
| 5,518,370 A | 5/1996 | Wang et al. |
| D374,712 S | 10/1996 | Jane et al. |
| 5,570,909 A | 11/1996 | Reynolds, Jr. |
| 5,609,473 A | 3/1997 | Litvin |
| 5,623,918 A | 4/1997 | Swilik, Jr. et al. |
| 5,645,769 A | 7/1997 | Tamaru et al. |
| 5,649,370 A | 7/1997 | Russo |
| D382,951 S | 8/1997 | Deines et al. |
| 5,671,321 A | 9/1997 | Bagnuolo |
| 5,677,982 A | 10/1997 | Levine et al. |
| 5,706,985 A | 1/1998 | Feer |
| 5,735,683 A | 4/1998 | Muschelknautz |
| 5,762,034 A | 6/1998 | Foss |
| 5,762,661 A | 6/1998 | Kleinberger et al. |
| 5,769,648 A | 6/1998 | Hayashi |
| 5,783,117 A | 7/1998 | Byassee et al. |
| 5,794,306 A | 8/1998 | Firdaus |
| D398,983 S | 9/1998 | Keller et al. |
| 5,800,188 A | 9/1998 | Barber et al. |
| 5,816,643 A | 10/1998 | Itou et al. |
| 5,841,080 A | 11/1998 | Iida et al. |
| 5,843,344 A | 12/1998 | Junket et al. |
| 5,859,952 A * | 1/1999 | Levine et al. ................ 392/405 |
| 5,862,037 A | 1/1999 | Behl |
| 5,868,197 A | 2/1999 | Potier |
| 5,881,685 A | 3/1999 | Foss et al. |
| 5,922,247 A | 7/1999 | Shoham et al. |
| D415,271 S | 10/1999 | Feer |
| 6,015,274 A | 1/2000 | Bias et al. |
| D423,663 S | 4/2000 | Rossman et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,200,155 B1 | 3/2001 | Chudkosky et al. |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,443,714 B1 | 9/2002 | Hollenbeck et al. |
| 6,480,672 B1 | 11/2002 | Rosenzweig et al. |
| 6,599,088 B2 | 7/2003 | Stagg |
| 6,604,694 B1 | 8/2003 | Kordas et al. |
| D483,851 S | 12/2003 | Fok |
| D485,895 S | 1/2004 | Melwani |
| D486,903 S | 2/2004 | Chiang |
| 6,715,739 B2 | 4/2004 | Mulvaney et al. |
| 6,789,787 B2 | 9/2004 | Stutts |
| 6,791,056 B2 | 9/2004 | VanOtteren et al. |
| 6,830,433 B2 | 12/2004 | Birdsell et al. |
| 6,845,971 B2 | 1/2005 | Bachert |
| D512,772 S | 12/2005 | Lee |

(56) References Cited

U.S. PATENT DOCUMENTS

| | | | |
|---|---|---|---|
| D513,067 S | 12/2005 | Blateri | |
| 7,059,826 B2 | 6/2006 | Lasko | |
| 7,088,913 B1 | 8/2006 | Verhoorn et al. | |
| 7,147,336 B1 | 12/2006 | Chou | |
| 7,156,677 B2 | 1/2007 | Yamane | |
| D539,414 S | 3/2007 | Russak et al. | |
| 7,192,258 B2 | 3/2007 | Kuo et al. | |
| 7,198,473 B2 | 4/2007 | Stickland et al. | |
| D544,078 S | 6/2007 | Geringer | |
| 7,362,964 B2 | 4/2008 | Wang | |
| 7,412,781 B2 | 8/2008 | Mattinger et al. | |
| 7,478,993 B2 | 1/2009 | Hong et al. | |
| 7,540,474 B1 | 6/2009 | Huang et al. | |
| D595,835 S | 7/2009 | Fu | |
| D598,532 S | 8/2009 | Dyson et al. | |
| D602,143 S | 10/2009 | Gammack et al. | |
| D602,144 S | 10/2009 | Dyson et al. | |
| D605,748 S | 12/2009 | Gammack et al. | |
| 7,660,110 B2 | 2/2010 | Vinson et al. | |
| 7,664,377 B2 | 2/2010 | Liao | |
| D614,280 S | 4/2010 | Dyson et al. | |
| 7,731,050 B2 | 6/2010 | Parks et al. | |
| 7,775,848 B1 | 8/2010 | Auerbach | |
| 7,806,388 B2 | 10/2010 | Junkel et al. | |
| 7,841,045 B2 | 11/2010 | Shaanan et al. | |
| D633,997 S | 3/2011 | Hideharu et al. | |
| D633,999 S | 3/2011 | Hideharu et al. | |
| 7,931,449 B2 | 4/2011 | Fitton et al. | |
| D638,114 S | 5/2011 | Li et al. | |
| 7,950,931 B2 | 5/2011 | Nakanashi et al. | |
| D643,098 S | 8/2011 | Wallace et al. | |
| 8,002,520 B2 | 8/2011 | Dawson et al. | |
| D644,726 S | 9/2011 | Hideharu et al. | |
| D645,133 S | 9/2011 | Hideharu | |
| D646,373 S | 10/2011 | Liebson et al. | |
| 8,092,166 B2 | 1/2012 | Nicolas et al. | |
| 8,113,490 B2 | 2/2012 | Chen | |
| 8,133,440 B2 | 3/2012 | Joergensen | |
| 8,152,495 B2 | 4/2012 | Boggess, Jr. et al. | |
| 8,196,903 B2 | 6/2012 | Joergensen | |
| 8,246,317 B2 | 8/2012 | Gammack | |
| D669,164 S | 10/2012 | Hsu | |
| 8,296,993 B2 | 10/2012 | Modlin et al. | |
| 8,308,445 B2 | 11/2012 | Gammack et al. | |
| D672,023 S | 12/2012 | Wallace et al. | |
| D672,024 S | 12/2012 | Fitton et al. | |
| 8,348,629 B2 | 1/2013 | Fitton et al. | |
| 8,356,804 B2 | 1/2013 | Fitton et al. | |
| D676,536 S | 2/2013 | Roach et al. | |
| 8,383,963 B2 | 2/2013 | Ejima | |
| D678,993 S | 3/2013 | Kung-Hua | |
| 8,403,640 B2 | 3/2013 | Gammack et al. | |
| 8,408,869 B2 | 4/2013 | Hutton et al. | |
| D681,793 S | 5/2013 | Li | |
| D684,249 S | 6/2013 | Herbst | |
| 8,454,322 B2 | 6/2013 | Gammack et al. | |
| 8,469,660 B2 | 6/2013 | Dyson et al. | |
| 8,529,226 B2 | 9/2013 | Li | |
| 8,544,826 B2 | 10/2013 | Ediger et al. | |
| 8,597,039 B2 | 12/2013 | Osawa | |
| D698,018 S | 1/2014 | Choi | |
| D700,959 S | 3/2014 | Sickinger et al. | |
| 8,684,687 B2 | 4/2014 | Dyson et al. | |
| D705,415 S | 5/2014 | Lo | |
| 8,721,286 B2 | 5/2014 | Gammack et al. | |
| 8,721,307 B2 | 5/2014 | Li | |
| 8,764,412 B2 | 7/2014 | Gammack et al. | |
| 8,783,663 B2 | 7/2014 | Fitton et al. | |
| 8,784,071 B2 | 7/2014 | Gammack | |
| 9,078,938 B2 | 7/2015 | Hsiao | |
| 2001/0017212 A1* | 8/2001 | Hirano | H05K 5/068 174/17 GF |
| 2002/0104972 A1 | 8/2002 | Guzorek | |
| 2002/0106547 A1 | 8/2002 | Sugawara et al. | |
| 2002/0190400 A1* | 12/2002 | Bachert | B01F 3/0407 261/81 |
| 2003/0059307 A1 | 3/2003 | Moreno et al. | |
| 2003/0064677 A1 | 4/2003 | Terrell et al. | |
| 2003/0164367 A1 | 9/2003 | Bucher et al. | |
| 2003/0171093 A1 | 9/2003 | Gumucio Del Pozo | |
| 2003/0190183 A1 | 10/2003 | Hsing | |
| 2003/0230477 A1 | 12/2003 | Fink et al. | |
| 2004/0022631 A1 | 2/2004 | Birdsell et al. | |
| 2004/0049842 A1 | 3/2004 | Prehodka | |
| 2004/0106370 A1 | 6/2004 | Honda et al. | |
| 2004/0111828 A1 | 6/2004 | Evans | |
| 2004/0149881 A1 | 8/2004 | Allen | |
| 2005/0031448 A1 | 2/2005 | Lasko et al. | |
| 2005/0053465 A1 | 3/2005 | Roach et al. | |
| 2005/0069407 A1 | 3/2005 | Winkler et al. | |
| 2005/0128698 A1 | 6/2005 | Huang | |
| 2005/0163670 A1 | 7/2005 | Alleyne et al. | |
| 2005/0173997 A1 | 8/2005 | Schmid et al. | |
| 2005/0194167 A1 | 9/2005 | Kiyota et al. | |
| 2005/0258554 A1 | 11/2005 | Bachert | |
| 2005/0281672 A1 | 12/2005 | Parker et al. | |
| 2006/0172682 A1 | 8/2006 | Orr et al. | |
| 2006/0199515 A1 | 9/2006 | Lasko et al. | |
| 2006/0263073 A1 | 11/2006 | Clarke et al. | |
| 2006/0279927 A1 | 12/2006 | Strohm | |
| 2007/0009354 A1 | 1/2007 | Zahuranec | |
| 2007/0035189 A1 | 2/2007 | Matsumoto | |
| 2007/0041857 A1 | 2/2007 | Fleig | |
| 2007/0065280 A1 | 3/2007 | Fok | |
| 2007/0072460 A1 | 3/2007 | Stahle et al. | |
| 2007/0152356 A1 | 7/2007 | Huang | |
| 2007/0166160 A1 | 7/2007 | Russak et al. | |
| 2007/0176502 A1 | 8/2007 | Kasai et al. | |
| 2007/0224044 A1 | 9/2007 | Hong et al. | |
| 2007/0235555 A1 | 10/2007 | Helf et al. | |
| 2007/0237500 A1 | 10/2007 | Wang | |
| 2007/0269323 A1 | 11/2007 | Zhou et al. | |
| 2008/0020698 A1 | 1/2008 | Spaggiari | |
| 2008/0067263 A1 | 3/2008 | Modlin et al. | |
| 2008/0074864 A1 | 3/2008 | Molders | |
| 2008/0083085 A1 | 4/2008 | Genn | |
| 2008/0124060 A1 | 5/2008 | Gao | |
| 2008/0152482 A1 | 6/2008 | Patel | |
| 2008/0166224 A1 | 7/2008 | Giffin | |
| 2008/0244860 A1 | 10/2008 | Gammack et al. | |
| 2008/0286130 A1 | 11/2008 | Purvines | |
| 2008/0314250 A1 | 12/2008 | Cowie et al. | |
| 2009/0026850 A1 | 1/2009 | Fu | |
| 2009/0032130 A1 | 2/2009 | Dumas et al. | |
| 2009/0039805 A1 | 2/2009 | Tang | |
| 2009/0060710 A1 | 3/2009 | Gammack et al. | |
| 2009/0060711 A1 | 3/2009 | Gammack et al. | |
| 2009/0078120 A1 | 3/2009 | Kummer et al. | |
| 2009/0120925 A1 | 5/2009 | Lasko | |
| 2009/0191054 A1 | 7/2009 | Winkler | |
| 2009/0214341 A1 | 8/2009 | Craig | |
| 2009/0301482 A1 | 12/2009 | Burton et al. | |
| 2010/0133707 A1 | 6/2010 | Huang | |
| 2010/0150699 A1 | 6/2010 | Nicolas et al. | |
| 2010/0162011 A1 | 6/2010 | Min | |
| 2010/0171465 A1 | 7/2010 | Seal et al. | |
| 2010/0225012 A1* | 9/2010 | Fitton | F24F 1/01 261/116 |
| 2010/0226749 A1 | 9/2010 | Gammack et al. | |
| 2010/0226750 A1 | 9/2010 | Gammack | |
| 2010/0226751 A1 | 9/2010 | Gammack et al. | |
| 2010/0226752 A1 | 9/2010 | Gammack et al. | |
| 2010/0226753 A1 | 9/2010 | Dyson et al. | |
| 2010/0226754 A1 | 9/2010 | Hutton et al. | |
| 2010/0226758 A1 | 9/2010 | Cookson et al. | |
| 2010/0226763 A1 | 9/2010 | Gammack et al. | |
| 2010/0226764 A1 | 9/2010 | Gammack et al. | |
| 2010/0226769 A1 | 9/2010 | Helps | |
| 2010/0226771 A1 | 9/2010 | Crawford et al. | |
| 2010/0226787 A1 | 9/2010 | Gammack et al. | |
| 2010/0226797 A1 | 9/2010 | Fitton et al. | |
| 2010/0226801 A1 | 9/2010 | Gammack | |
| 2010/0254800 A1 | 10/2010 | Fitton et al. | |

(56) References Cited

U.S. PATENT DOCUMENTS

| | | |
|---|---|---|
| 2011/0017212 A1* | 1/2011 | Kenyon .............. A61M 16/00 128/203.26 |
| 2011/0058935 A1 | 3/2011 | Gammack et al. |
| 2011/0080724 A1 | 4/2011 | Jörgensen |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2011/0236228 A1 | 9/2011 | Fitton et al. |
| 2011/0248096 A1 | 10/2011 | Lin et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0051884 A1 | 3/2012 | Junkel et al. |
| 2012/0057959 A1 | 3/2012 | Hodgson et al. |
| 2012/0079673 A1 | 4/2012 | Wishney et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0107096 A1 | 5/2012 | Yang et al. |
| 2012/0114513 A1 | 5/2012 | Simmonds et al. |
| 2012/0121409 A1 | 5/2012 | Liu et al. |
| 2012/0230658 A1 | 9/2012 | Fitton et al. |
| 2012/0295460 A1 | 11/2012 | Ichio et al. |
| 2012/0308375 A1 | 12/2012 | Gammack |
| 2012/0318393 A1 | 12/2012 | Tsen |
| 2012/0319311 A1 | 12/2012 | Nutter et al. |
| 2013/0011252 A1 | 1/2013 | Crawford et al. |
| 2013/0026664 A1 | 1/2013 | Staniforth et al. |
| 2013/0028763 A1 | 1/2013 | Staniforth et al. |
| 2013/0028766 A1 | 1/2013 | Staniforth et al. |
| 2013/0077292 A1 | 3/2013 | Zimmerman |
| 2013/0129490 A1 | 5/2013 | Dos Reis et al. |
| 2013/0142676 A1 | 6/2013 | Zou |
| 2013/0143481 A1 | 6/2013 | Kagawa et al. |
| 2013/0161842 A1 | 6/2013 | Fitton et al. |
| 2013/0175711 A1 | 7/2013 | Nutter et al. |
| 2013/0199372 A1 | 8/2013 | Nock et al. |
| 2013/0234346 A1 | 9/2013 | Staniforth et al. |
| 2013/0234347 A1 | 9/2013 | Staniforth et al. |
| 2013/0243588 A1 | 9/2013 | Lo |
| 2013/0249122 A1 | 9/2013 | Staniforth et al. |
| 2013/0249124 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0309065 A1 | 11/2013 | Johnson et al. |
| 2013/0309080 A1 | 11/2013 | Johnson et al. |
| 2013/0320574 A1 | 12/2013 | Sickinger et al. |
| 2013/0323100 A1 | 12/2013 | Poulton et al. |
| 2013/0330215 A1 | 12/2013 | Li |
| 2013/0336771 A1 | 12/2013 | Dyson et al. |
| 2014/0017069 A1 | 1/2014 | Peters |
| 2014/0077398 A1 | 3/2014 | Staniforth et al. |
| 2014/0079566 A1 | 3/2014 | Gammack et al. |
| 2014/0084492 A1 | 3/2014 | Staniforth et al. |
| 2014/0210114 A1 | 7/2014 | Staniforth et al. |
| 2014/0210115 A1 | 7/2014 | Staniforth et al. |
| 2014/0255173 A1 | 9/2014 | Poulton et al. |
| 2014/0255217 A1 | 9/2014 | Li |
| 2015/0084214 A1 | 3/2015 | Wilson et al. |
| 2015/0247508 A1 | 9/2015 | Lyons |
| 2016/0032927 A1 | 2/2016 | Johnson et al. |
| 2016/0032941 A1 | 2/2016 | Beavis et al. |
| 2016/0033148 A1 | 2/2016 | Darvill |
| 2016/0033150 A1 | 2/2016 | Staniforth et al. |
| 2017/0321915 A1 | 11/2017 | Staniforth et al. |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 1446116 | 10/2003 |
| CN | 2650005 | 10/2004 |
| CN | 2713643 | 7/2005 |
| CN | 1680727 | 10/2005 |
| CN | 1724950 | 1/2006 |
| CN | 2833197 | 11/2006 |
| CN | 201011346 | 1/2008 |
| CN | 201147215 | 11/2008 |
| CN | 201180678 | 1/2009 |
| CN | 201221477 | 4/2009 |
| CN | 101424279 | 5/2009 |
| CN | 101451754 A | 6/2009 |
| CN | 201281416 | 7/2009 |
| CN | 201349269 | 11/2009 |
| CN | 101684828 | 3/2010 |
| CN | 201486901 | 5/2010 |
| CN | 101726100 | 6/2010 |
| CN | 101749288 | 6/2010 |
| CN | 201502549 | 6/2010 |
| CN | 201507461 | 6/2010 |
| CN | 201518985 | 7/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 101825324 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 U | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 301539668 | 5/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 202056121 | 11/2011 |
| CN | 102287357 | 12/2011 |
| CN | 202101355 | 1/2012 |
| CN | 102367813 | 3/2012 |
| CN | 202267207 | 6/2012 |
| CN | 301949285 | 6/2012 |
| CN | 202301225 | 7/2012 |
| CN | 202301226 | 7/2012 |
| CN | 202431623 | 9/2012 |
| CN | 102720681 | 10/2012 |
| CN | 102900654 | 1/2013 |
| CN | 103644150 | 3/2014 |
| CN | 103697556 | 4/2014 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |

(56) References Cited

FOREIGN PATENT DOCUMENTS

| | | |
|---|---|---|
| DE | 10 2009 039 783 | 4/2010 |
| DE | 10 2009 007 037 | 8/2010 |
| EP | 0 044 494 | 1/1982 |
| EP | 0186581 | 7/1986 |
| EP | 0 459 812 | 12/1991 |
| EP | 0 784 947 | 7/1997 |
| EP | 0 846 868 | 6/1998 |
| EP | 1 094 224 | 4/2001 |
| EP | 1 138 954 | 10/2001 |
| EP | 1357296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2 230 467 | 9/2010 |
| EP | 2 414 738 | 2/2012 |
| EP | 2 578 889 | 4/2013 |
| FR | 1033034 | 7/1953 |
| FR | 1119439 | 6/1956 |
| FR | 1387334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 861749 | 2/1961 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484671 | 4/2012 |
| GB | 2484695 A | 4/2012 |
| GB | 2484761 | 4/2012 |
| GB | 2493231 A | 1/2013 |
| GB | 2493505 A | 2/2013 |
| GB | 2493507 A | 2/2013 |
| GB | 2499041 | 8/2013 |
| GB | 2500005 | 9/2013 |
| GB | 2500010 | 9/2013 |
| GB | 2500011 | 9/2013 |
| GB | 2500012 | 9/2013 |
| GB | 2504415 | 1/2014 |
| JP | 31-13055 | 8/1956 |
| JP | 35-4369 | 3/1960 |
| JP | 39-7297 | 3/1964 |
| JP | 46-7230 | 12/1971 |
| JP | 47-21718 | 10/1972 |
| JP | 49-43764 | 4/1974 |
| JP | 49-150403 | 12/1974 |
| JP | 50-92046 | 8/1975 |
| JP | 51-7258 | 1/1976 |
| JP | 52-121045 | 9/1977 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-98099 | 5/1987 |
| JP | 62-223494 | 10/1987 |
| JP | 63-36794 | 3/1988 |
| JP | 63-179198 | 7/1988 |
| JP | 63-198933 | 12/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |
| JP | 1-169251 | 7/1989 |
| JP | 1-224598 | 9/1989 |
| JP | 2-146294 | 6/1990 |
| JP | 2-104872 | 8/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-99386 | 4/1993 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-111174 | 4/1995 |
| JP | 7-190443 | 7/1995 |
| JP | 8-21400 | 1/1996 |
| JP | 8-72525 | 3/1996 |
| JP | 8-313019 | 11/1996 |
| JP | 9-100800 | 4/1997 |
| JP | 9-178083 | 7/1997 |
| JP | 9-287600 | 11/1997 |
| JP | 11-83094 | 3/1999 |
| JP | 11-502586 | 3/1999 |
| JP | 11-227866 | 8/1999 |
| JP | 2000-55419 | 2/2000 |
| JP | 2000-116179 | 4/2000 |
| JP | 2000-201723 | 7/2000 |

(56) References Cited

FOREIGN PATENT DOCUMENTS

| | | |
|---|---|---|
| JP | 2001-17358 | 1/2001 |
| JP | 2002-21797 | 1/2002 |
| JP | 2002-138829 | 5/2002 |
| JP | 2002-213388 | 7/2002 |
| JP | 2003-4265 | 1/2003 |
| JP | 2003-161473 | 6/2003 |
| JP | 2003 161473 * | 6/2003 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-3042 | 1/2006 |
| JP | 2006-89096 | 4/2006 |
| JP | 2006-189221 | 7/2006 |
| JP | 3124510 | 8/2006 |
| JP | 3127331 | 11/2006 |
| JP | 2007-51826 | 3/2007 |
| JP | 2007-138763 | 6/2007 |
| JP | 2007-138789 | 6/2007 |
| JP | 2008-39316 | 2/2008 |
| JP | 2008-100204 | 5/2008 |
| JP | 2008-107037 | 5/2008 |
| JP | 3144127 | 7/2008 |
| JP | 3146538 | 10/2008 |
| JP | 2008-292078 | 12/2008 |
| JP | 2008-294243 | 12/2008 |
| JP | 2009-44568 | 2/2009 |
| JP | 2009-62986 | 3/2009 |
| JP | D1371413 | 10/2009 |
| JP | 2009-275925 | 11/2009 |
| JP | 2009-281677 * | 12/2009 |
| JP | D1376284 | 12/2009 |
| JP | 2010-46411 | 3/2010 |
| JP | 2010-59845 | 3/2010 |
| JP | 2010-131259 | 6/2010 |
| JP | 2010-203760 | 9/2010 |
| JP | 2010-203764 | 9/2010 |
| JP | 3168517 | 6/2011 |
| JP | 2011-183204 | 9/2011 |
| JP | 2012-31806 | 2/2012 |
| JP | 2012-149842 | 8/2012 |
| JP | 2012-154527 | 8/2012 |
| JP | 2013-508667 | 3/2013 |
| JP | 2013-185821 | 9/2013 |
| KR | 1999-002660 | 1/1999 |
| KR | 10-2005-0102317 | 10/2005 |
| KR | 2007-0007997 | 1/2007 |
| KR | 20-0448319 | 3/2010 |
| KR | 10-2010-0055611 | 5/2010 |
| KR | 10-0985378 | 9/2010 |
| KR | 10-2011-0096588 | 8/2011 |
| KR | 10-2012-0005264 | 1/2012 |
| KR | 10-1203379 | 11/2012 |
| RU | 113 817 | 2/2012 |
| TW | 517825 | 1/2003 |
| TW | 589932 | 6/2004 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO 2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO 2011/050041 * | 4/2011 |
| WO | WO-2011/050041 A1 | 4/2011 |
| WO | WO 2011050041 A1 * | 4/2011 ............... F24F 6/02 |
| WO | WO-2011/147318 | 12/2011 |
| WO | WO-2012/006882 | 1/2012 |
| WO | WO-2012/033517 | 3/2012 |
| WO | WO-2012/052737 | 4/2012 |
| WO | WO-2013/014419 A2 | 1/2013 |
| WO | WO-2013/132218 | 9/2013 |
| WO | WO-2013/132222 | 9/2013 |

OTHER PUBLICATIONS

EPO and Google translation of Hiwatari JP 2009-281677 published on Dec. 3, 2009.*

EPO translation of Hiwatari JP 2009-281677 published on Dec. 3, 2009.*

Tapping "Humidifiers Choosing the best humidifier for you" published Aug. 27, 2011 accessed at <http://web.archive.org/web/20110827174911/http://www.allergybuyersclub.com/humidifiers-cool-mist-warm-review.html>.*

Fitton et al., U.S. Office Action dated Dec. 31, 2013, directed to U.S. Appl. No. 13/718,693; 8 pages.

Gammack et al., U.S. Office Action dated Feb. 28, 2013, directed to U.S. Appl. No. 12/945,558; 16 pages.

Gammack et al., U.S. Office Action dated Jun. 12, 2013, directed to U.S. Appl. No. 12/945,558; 20 pages.

Helps et al., U.S. Office Action dated Feb. 15, 2013, directed to U.S. Appl. No. 12/716,694; 12 pages.

Gammack et al., U.S. Office Action dated May 29, 2013, directed to U.S. Appl. No. 13/588,666; 11 pages.

Gammack et al., U.S. Office Action dated Sep. 27, 2013, directed to U.S. Appl. No. 13/588,666; 10 pages.

Gammack et al., U.S. Office Action dated Mar. 14, 2013, directed to U.S. Appl. No. 12/716,740; 15 pages.

Gammack et al., U.S. Office Action dated Sep. 6, 2013, directed to U.S. Appl. No. 12/716,740; 15 pages.

Gammack et al., U.S. Office Action dated Apr. 24, 2014, directed to U.S. Appl. No. 12/716,740; 16 pages.

Li et al., U.S. Office Action dated Oct. 25, 2013, directed to U.S. Appl. No. 13/686,480; 17 pages.

Fitton et al., U.S. Office Action dated Jun. 13, 2014, directed to U.S. Appl. No. 13/274,998; 11 pages.

Fitton et al., U.S. Office Action dated Jun. 13, 2014, directed to U.S. Appl. No. 13/275,034; 10 pages.

Gammack et al., U.S. Office Action dated Feb. 14, 2013, directed to U.S. Appl. No. 12/716,515; 21 pages.

Gammack et al., U.S. Office Action dated Aug. 19, 2013, directed to U.S. Appl. No. 12/716,515; 20 pages.

Gammack et al., U.S. Office Action dated Feb. 10, 2014, directed to U.S. Appl. No. 12/716,515; 21 pages.

Gammack et al., U.S. Office Action dated Sep. 3, 2014, directed to U.S. Appl. No. 13/861,891; 7 pages.

Wallace et al., U.S. Office Action dated Jun. 7, 2013, directed to U.S. Appl. No. 13/192,223; 30 pages.

Wallace et al., U.S. Office Action dated Oct. 23, 2013, directed to U.S. Appl. No. 13/192,223; 18 pages.

Dos Reis et al., U.S. Office Action dated Sep. 23, 2014, directed to U.S. Appl. No. 29/466,240; 9 pages.

Dos Reis et al., U.S. Office Action dated Sep. 24, 2014, directed to U.S. Appl. No. 29/466,229; 9 pages.

Dos Reis et al., U.S. Office Action dated Sep. 19, 2014, directed to U.S. Appl. No. 29/466,190; 9 pages.

Mcpherson et al., U.S. Office Action dated Sep. 19, 2014, directed to U.S. Appl. No. 29/466,094; 8 pages.

(56) References Cited

OTHER PUBLICATIONS

Mcpherson et al., U.S. Office Action dated Sep. 19, 2014, directed to U.S. Appl. No. 29/466,241; 8 pages.
Mcpherson et al., U.S. Office Action dated Sep. 19, 2014, directed to U.S. Appl. No. 29/466,253; 7 pages.
Dyson et al., U.S. Office Action dated Sep. 12, 2014, directed to U.S. Appl. No. 29/480,896; 10 pages.
Dyson et al., U.S. Office Action dated Sep. 12, 2014, directed to U.S. Appl. No. 29/480,915; 9 pages.
Poulton et al., U.S. Office Action dated Sep. 12, 2014, directed to U.S. Appl. No. 29/480,919; 10 pages.
Deniss. (Sep. 9, 2010) "iFan, The Chinese Clone of the Dyson Air Multiplier," located at <http://chinitech.com/en/chinese-clones/ifan-le-clone-chinois-du-dyson-air-multiPlier> visited on Aug. 29, 2014. (6 pages).
Amee. (Mar. 29, 2012) "Breeze Right Bladeless Fan Up to 41% Off," located at <http://madamedeals.com/breeze-right-bladeless-fan-up-to-41-off/> visited on Sep. 3, 2014. (2 pages).
Questel. (Jun. 11, 2014) "Designs-Questel" located at <http://sobjprd.questel.fr/export/QPTUJ214/pdf2/19f053ea-a60f-4c58-9232-c458147a9adf-224304.pdf/> visited on Sep. 4, 2014. (67 pages).
Amazon. "Pisenic Bladeless Fan 16 Inches with Remote Control, Bladeless Fan Air Conditioner 110v, Air Multiplier Table Fans, Green," located at <http://www.amazon.com/Pisenic-Bladeless-Fan-16-Conditioner/dp/B007VCI78M%3FSubscriptionid%3DAKIAJYLII7AAJMX7ETAA%26tag%3Dtk7820%26linkCode%3Dxm2%26camp%3D2025%26creative%3D165953%26creativeASIN%3DB007VCI78M#cm_cr_dpwidget> visited on Sep. 2, 2014. (4 pages).
Steiner, L., (May 14, 2013) "Dyson Fan Heater Review: Cozy Up to Dyson Fan Heater," located at <http://www.vissbiz.com/dyson-fan-heater-review/cozy-up-to-dyson-fan-heater/> visited on Sep. 3, 2014. (3 pages).
Search Report dated May 31, 2012, directed to GB Application No. 1203909.5; 2 pages.
Gammack, P. et al., U.S. Office Action dated Dec. 9, 2010, directed to U.S. Appl. No. 12/203,698; 10 pages.
Gammack, P. et al., U.S. Office Action dated Jun. 21,2011, directed to U.S. Appl. No. 12/203,698; 11 pages.
Gammack et al., Office Action dated Sep. 17, 2012, directed to U.S. Appl. No. 13/114,707; 12 pages.
Gammack, P. et al., U.S. Office Action dated Dec. 10, 2010, directed to U.S. Appl. No. 12/230,613; 12 pages.
Gammack, P. et al., U.S. Office Action dated May 13, 2011, directed to U.S. Appl. No. 12/230,613; 13 pages.
Gammack, P. et al., U.S. Office Action dated Sep. 7, 2011, directed to U.S. Appl. No. 12/230,613; 15 pages.
Gammack, P. et al., U.S. Office Action dated Jun. 8, 2012, directed to U.S. Appl. No. 12/230,613; 15 pages.
Gammack et al., U.S. Office Action dated Aug. 20, 2012, directed to U.S. Appl. No. 12/945,558; 15 pages.
Fitton et al., U.S. Office Action dated Nov. 30, 2010 directed to U.S. Appl. No. 12/560,232; 9 pages.
Nicolas, F. et al., U.S. Office Action dated Mar. 7, 2011, directed to U.S. Appl. No. 12/622,844; 10 pages.
Nicolas, F. et al., U.S. Office Action dated Sep. 8, 2011, directed to U.S. Appl. No. 12/622,844; 11 pages.
Fitton, et al., U.S. Office Action dated Mar. 8, 2011, directed to U.S. Appl. No. 12/716,780; 12 pages.
Fitton, et al., U.S. Office Action dated Sep. 6, 2011, directed to U.S. Appl. No. 12/716,780; 16 pages.
Gammack, P. et al., U.S. Office Action dated Dec. 9, 2010, directed to U.S. Appl. No. 12/716,781; 17 pages.
Gammack, P. et al., U.S. Final Office Action dated Jun. 24, 2011, directed to U.S. Appl. No. 12/716,781; 19 pages.
Gammack, P. et al., U.S. Office Action dated Apr. 12, 2011, directed to U.S. Appl. No. 12/716,749; 8 pages.
Gammack, P. et al., U.S. Office Action dated Sep. 1, 2011, directed to U.S. Appl. No. 12/716,749; 9 pages.
Gammack, P. et al., U.S. Office Action dated Jun. 25, 2012, directed to U.S. Appl. No. 12/716,749; 11 pages.
Fitton et al., U.S. Office Action dated Mar. 30, 2012, directed to U.S. Appl. No. 12/716,707; 7 pages.
Gammack, P. et al., U.S. Office Action dated May 24, 2011, directed to U.S. Appl. No. 12/716,613; 9 pages.
Gammack, P. et al. U.S. Office Action dated Oct. 18, 2012, directed to U.S. Appl. No. 12/917,247; 11 pages.
Reba, I. (1966). "Applications of the Coanda Effect," *Scientific American* 214:84-92.
Third Party Submission Under 37 CFR 1.99 filed Jun. 2, 2011, directed towards U.S. Appl. No. 12/203,698; 3 pages.
International Search Report dated Apr. 19, 2013, directed to International Application No. PCT/GB2013/050329; 3 pages.
Staniforth et al., U.S. Office Adtion mailed Sep. 18, 2014, directed to U.S. Application No. 13/559,142; 18 pages.
Staniforth et al., U.S. Office Action dated Jun. 4, 2015, directed to U.S. Appl. No. 13/784,430; 17 pages.
Dyson et al., U.S. Office Action dated May 28, 2015, directed to U.S. Appl. No. 29/460,993; 9 pages.
Staniforth et al., U.S. Office Action dated Feb. 27, 2015, directed to U.S. Appl. No. 13/786,014; 7 pages.
Dyson et al., U.S. Office Action dated Apr. 27, 2015, directed to U.S. Appl. No. 29/460,994; 6 pages.
Dyson et al., U.S. Office Action dated Apr. 24, 2015, directed to U.S. Appl. No. 29/460,990; 6 pages.
Dyson et al., U.S. Office Action dated Apr. 10, 2015, directed to U.S. Appl. No. 29/460,989; 7 pages.
Staniforth et al., U.S. Office Action dated Mar. 11, 2016, directed to U.S. Appl. No. 13/785,954; 16 pages.
Staniforth et al., U.S. Office Action dated Mar. 1, 2016, directed to U.S. Appl. No. 13/786,226; 19 pages.
Staniforth et al., U.S. Office Action dated Mar. 1, 2016, directed to U.S. Appl. No. 13/786,082; 19 pages.
Staniforth et al., U.S. Office Action dated May 2, 2016, directed to U.S. Appl. No. 14/166,152; 18 pages.
Staniforth et al., U.S. Office Action dated Mar. 30, 2016, directed to U.S. Appl. No. 14/166,472; 47 pages.
Staniforth et al., U.S. Office Action dated Sep. 30, 2015, directed to U.S. Appl. No. 13/786,014; 8 pages.
Staniforth et al., U.S. Office Action dated Oct. 15, 2015, directed to U.S. Appl. No. 13/786,313; 18 pages.
Staniforth et al., U.S. Office Action dated Feb. 2, 2016, directed to U.S. Appl. No. 13/784,430; 19 pages.
Staniforth et al., U.S. Office Action dated Sep. 21, 2015, directed to U.S. Appl. No. 13/785,954; 16 pages.
Staniforth et al., U.S. Office Action dated Sep. 25, 2015, directed to U.S. Appl. No. 13/786,226; 20 pages.
Staniforth et al., U.S. Office Action dated Aug. 27, 2015, directed to U.S. Appl. No. 13/786,082; 20 pages.
Staniforth et al., U.S. Office Action dated May 25, 2016, directed to U.S. Appl. No. 13/786,313; 19 pages.
Staniforth et al., U.S. Office Action dated Aug. 19, 2016, directed to U.S. Appl. No. 13/784,430; 20 pages.
Beavis et al., U.S. Office Action dated Jul. 11, 2017, directed to U.S. Appl. No. 14/812,969; 8 pages.
Johnson et al., U.S. Office Action dated Jul. 18, 2017, directed to U.S. Appl. No. 14/812,974; 9 pages.
Staniforth et al., U.S. Ex Parte Quayle Action mailed Mar. 2, 2017, directed to U.S. Appl. No. 13/785,954; 7 pages.
Staniforth et al., U.S. Office Action dated Jan. 18, 2017, directed to U.S. Appl. No. 13/786,226; 21 pages.
Staniforth et al., U.S. Office Action dated Jan. 19, 2017, directed to U.S. Appl. No. 13/786,082; 25 pages.
Staniforth et al., U.S. Office Action dated Feb. 7, 2017, directed to U.S. Appl. No. 14/166,152; 15 pages.
Staniforth et al., U.S. Office Action dated Feb. 10, 2017, directed to U.S. Appl. No. 14/166,472; 31 pages.
Staniforth et al., U.S. Office Action dated Oct. 26, 2017, directed to U.S. Appl. No. 13/786,226; 20 pages.
Staniforth et al., U.S. Office Action dated Nov. 15, 2017, directed to U.S. Appl. No. 14/166,472; 29 pages.

(56) References Cited

OTHER PUBLICATIONS

Beavis et al., U.S. Office Action dated Oct. 25, 2017, directed to U.S. Appl. No. 14/812,969; 10 pages.
Staniforth et al., U.S. Office Action dated May 25, 2018, directed to U.S. Appl. No. 13/786,226; 34 pages.
Staniforth et al., U.S. Office Action dated May 29, 2018, directed to U.S. Appl. No. 14/166,472; 29 pages.
Staniforth et al., U.S. Office Action dated Nov. 16, 2018, directed to U.S. Appl. No. 13/786,226; 21 pages.

* cited by examiner

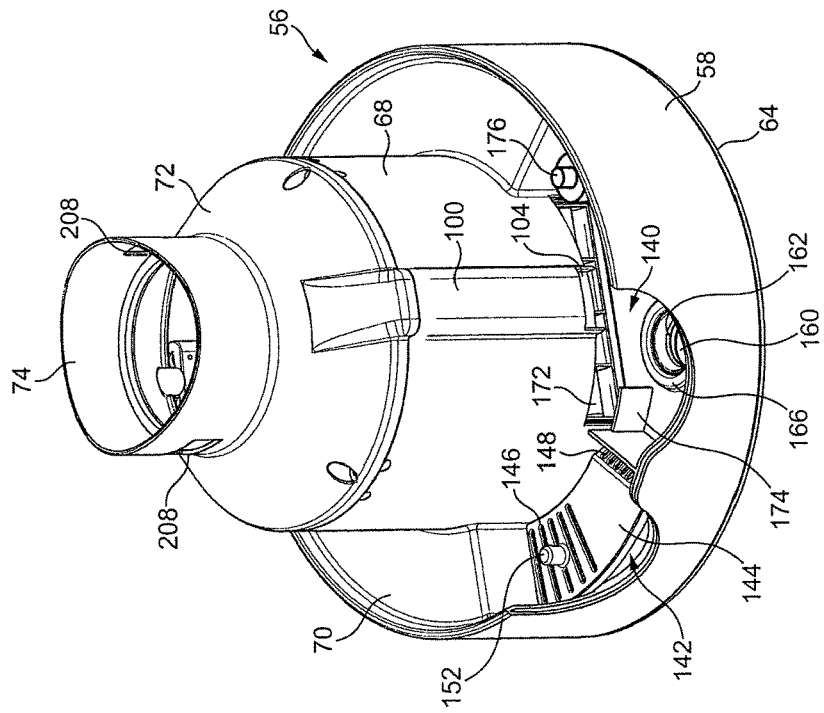
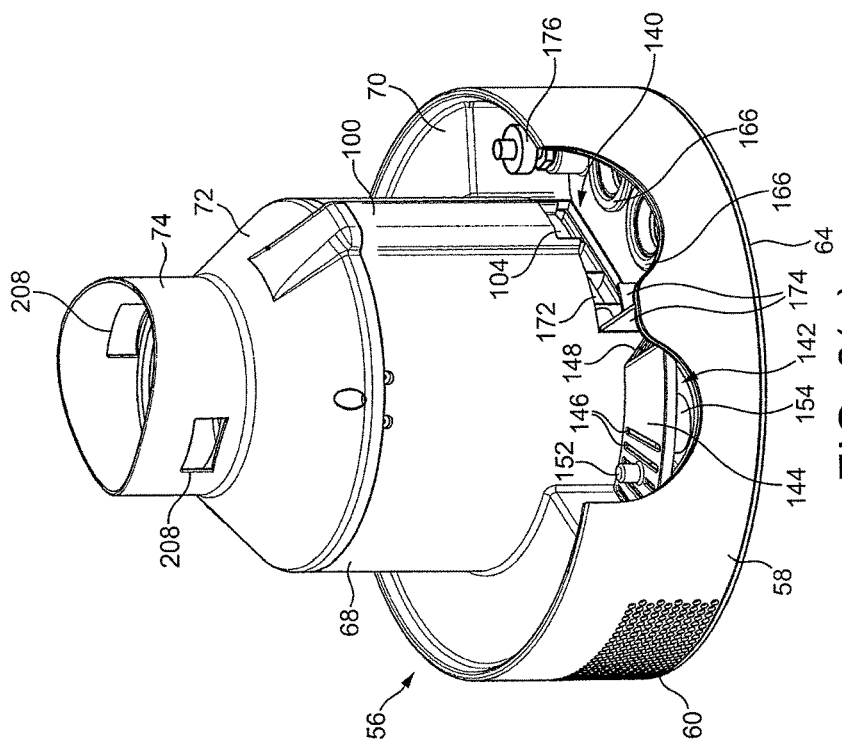

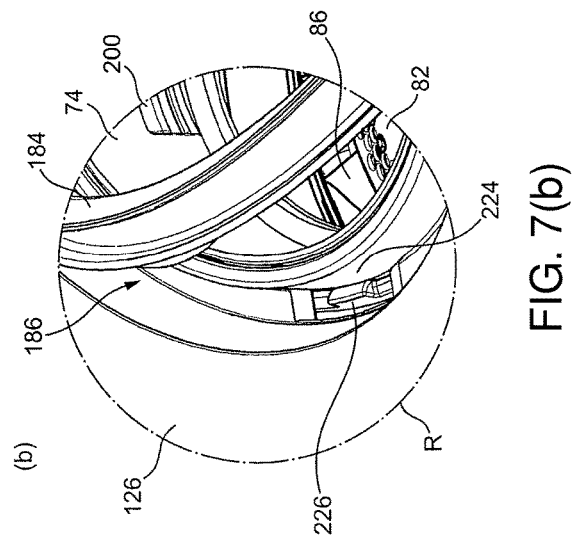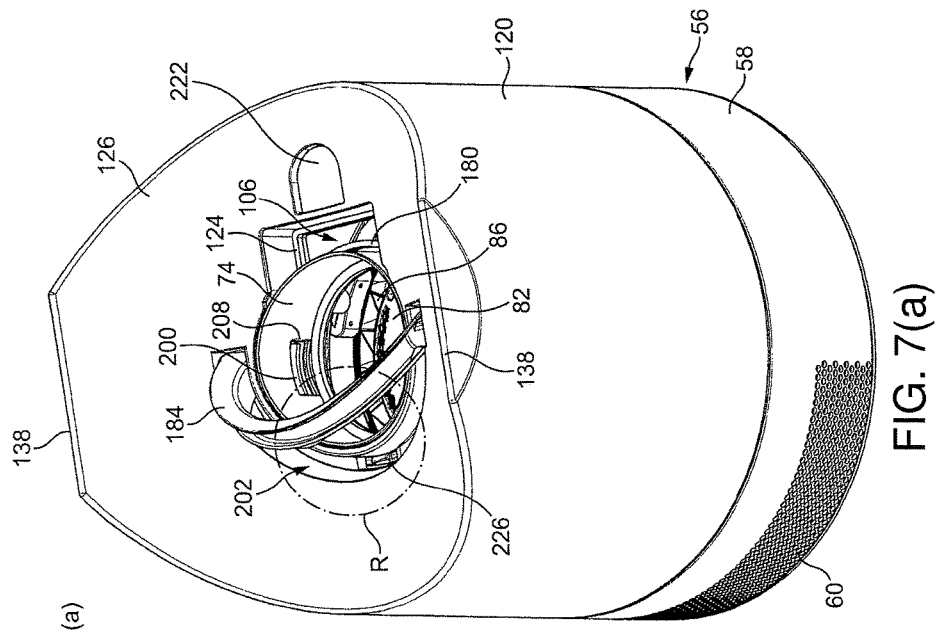

HUMIDIFYING APPARATUS

REFERENCE TO RELATED APPLICATIONS

This application claims the priority of United Kingdom Application no. 1203909.5, filed Mar. 6, 2012, the entire contents of which are incorporated herein by reference.

FIELD OF THE INVENTION

The present invention relates to a humidifying apparatus. In a preferred embodiment, the present invention provides a humidifying apparatus for generating a flow of moist air and a flow of air for dispersing the moist air within a domestic environment, such as a room, office or the like.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of a heater or a high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

It is known to provide an ultraviolet (UV) lamp or other UV radiation generator to sterilize water that is conveyed to the atomizing device. For example, U.S. Pat. No. 5,859,952 describes a humidifier in which the water supplied from a tank is conveyed through a sterilizing chamber before being conveyed by a pipe to a chamber containing an ultrasonic atomizer. The sterilizing chamber has a UV transparent window beneath which a UV lamp is located to irradiate water as it passes through the sterilizing chamber. U.S. Pat. No. 7,540,474 describes a humidifier in which the water tank includes a UV transparent tube for conveying water to an outlet of the tank, and a main body upon which the tank is mounted includes a UV lamp which irradiates water as it passes through the tube to the outlet.

SUMMARY OF THE INVENTION

In a first aspect, the present invention provides a method of generating a humid air flow, comprising the steps of irradiating water stored in a reservoir with ultraviolet radiation, conveying an air flow over water stored in the reservoir, and atomizing water stored in the reservoir to humidify the air flow, wherein water stored in the reservoir is agitated for a period of time during the irradiation of water stored in the reservoir and which is prior to the atomization of water stored in the reservoir.

The invention can enable a humidifying apparatus to have a compact appearance through both irradiating and atomizing water stored within a common reservoir. To enable the number of bacteria within the stored water to be reduced before the atomization of the stored water commences, there is a delay between the irradiation of the stored water with UV radiation and the commencement of the atomization of the stored water to humidify the air flow conveyed over the reservoir. During the period of time in which the irradiation is performed prior to the atomization of stored water, the water stored in the reservoir is agitated to generate a flow or swirl of water within the reservoir, and which conveys water through the UV radiation emitted into the reservoir. This can increase the volume of the stored water which is irradiated with UV radiation prior to the atomization of the stored water, and thus increase the rate of reduction of the number of bacteria within the water stored in the reservoir.

The duration of the period of time for which the stored water is irradiated with UV radiation prior to the commencement of the atomization of stored water will depend, inter alia, on the volume of the reservoir and the desired reduction in the number of bacteria within the stored water. For example, the duration of this period of time may be in the range from 10 to 300 seconds to achieve an appropriate reduction in the number of bacteria within the maximum volume of water which can be stored in the reservoir. The duration may be reduced depending on the length of time which has elapsed since the humidifying apparatus was previously operated. Water is preferably supplied to the reservoir from a tank which is removably mountable on a base or housing in which the reservoir is located. The water tank and the housing may together provide a body of the humidifying apparatus. The duration of the period of time for which water is irradiated prior to atomization may be set automatically to a maximum value when the water tank is removed from the housing, for example for replenishment.

The removal of the water tank from the housing may be detected by a proximity sensor located on the housing, and which interacts with a magnet or other feature located on the water tank to detect the presence or absence of the water tank on the housing. Both the agitation and the irradiation of stored water are preferably suspended if the water tank is removed from the housing.

The atomization and the irradiation of the stored water may also be suspended depending on the volume of water within the reservoir. For example, a level detector may be located in the reservoir for outputting a signal indicative of a low level of water in the reservoir, in response to which the atomization and the irradiation of the stored water are suspended.

The atomization of water stored in the reservoir may be suspended when the humidity of the air flow conveyed to the reservoir is above a first level, and resumed when the humidity of the air flow conveyed to the reservoir is below a second level lower than the first value. The first and second levels may be set according to a humidity level selected by a user either using a user interface located on the apparatus or using a remote control, and may be, for example, any relative humidity within the range from 30 to 80% at 20° C. For example, the first level may be 1% at 20° C. higher than the selected level, whereas the second level may be 1% at 20° C. lower than the selected level. Both the agitation and the irradiation of the stored water may be continued as the detected humidity falls from the first level to the second level. A sensor for detecting the humidity of the air flow conveyed to the reservoir may be provided at any convenient location upstream of the reservoir. For example, the sensor may be located immediately downstream from an air inlet of the apparatus.

The irradiation of the stored water with UV radiation may be performed by a UV lamp or other UV radiation generator.

The UV radiation generator may be located behind a window which partially defines the volume of the reservoir. Alternatively, the UV radiation generator may be located in the reservoir. For example, the UV radiation generator may comprise a UV transparent tube at least partially located in the reservoir so that agitated water moves along or around the outer surface of the tube. The reservoir may comprise a reflective surface for directing the UV radiation to one or more regions of the reservoir. This surface may define at least part of the reservoir, or it may be located above or within the reservoir. For example, at least part of one wall of the reservoir may be formed from, or coated with, reflective material. The reflective surface may extend around the tube. This can allow water surrounding the tube to be irradiated by UV radiation, thereby increasing the volume of water which can be irradiated in comparison to a system where a UV radiation generator is located adjacent to a window provided on one side of the reservoir. As the air flow is conveyed over water stored in the reservoir, a swirl of water is preferably generated within the stored water in such a direction as to generate a flow of water adjacent to, and preferably along, the tube.

Water is preferably supplied to the reservoir from an inlet located adjacent to the location at which the stored water is irradiated. At least one wall, baffle or other fluid guiding means may be provided in the reservoir to guide a flow of water entering the reservoir from the water tank adjacent to, and preferably along, the UV transparent tube or window behind which the UV radiation generator is located. As a result, water entering the reservoir from the tank—to replenish the reservoir during water atomization or when the reservoir is refilled—is irradiated with UV radiation before it is atomized. The agitation of the stored water preferably promotes the movement of water along and/or around the UV radiation generator.

The agitation of the water stored in the reservoir may be performed in one or more of a number of different ways. For example, the stored water may be agitated mechanically by an agitating device, such as a stirrer or other moveable device, provided in the reservoir for movement relative to the reservoir to agitate the stored water. As another example, the water stored in the reservoir may be agitated sonically by a transducer located in the reservoir. As a further example, the water stored in the reservoir may be agitated by aerating the stored water, for example by pumping air over or through the stored water. This pumped air may be diverted from the air flow conveyed over the stored water, or it may be generated separately from that air flow. As yet another example, the stored water may be agitated through oscillation or vibration of one or more of the walls of the reservoir.

In a preferred embodiment, the stored water is agitated by the air flow conveyed over the water stored in the reservoir, and so in a second aspect, the present invention provides a method of generating a humid air flow, comprising the steps of (i) irradiating water stored in a reservoir with ultraviolet radiation, (ii) conveying an air flow over water stored in the reservoir, and (iii) atomizing water stored in the reservoir to humidify the air flow, wherein steps (i) and (ii) are performed simultaneously for a period of time prior to step (iii).

The air flow is preferably conveyed into or over the reservoir above the maximum level to which water may be stored in the reservoir. For example, if the maximum water level is at the upper periphery of the reservoir, then air is preferably conveyed over the upper periphery of the reservoir. If the maximum water level is below the upper periphery of the reservoir, then air may be conveyed into the reservoir between the upper periphery of the reservoir and the maximum water level.

The air flow may be conveyed downwardly towards the surface of the stored water. The air flow may be emitted over the water in the reservoir from a first location, and the water stored in the reservoir may be irradiated at a second location proximate to the first location so that the agitation is initiated close to the irradiation device to maximise the rate at which the stored water moves relative to the irradiation device. The humidifying apparatus may comprise an inlet duct for conveying the air flow to the reservoir, and an outlet duct for conveying a humidified air flow away from the reservoir. An outlet port of the inlet duct may be shaped to emit the air flow in such a direction and/or with such a profile as to generate a swirling movement of the water stored in the reservoir.

The atomization is preferably conducted at a third location within the reservoir, with the second location being disposed between the first and third locations. This can prevent the air flow entering the reservoir from blowing stored water away from the location at which atomization is performed. The atomization may be performed by a heater but in a preferred embodiment the atomization is performed by a vibrating transducer. The transducer may be vibrated at one of a number of different modes. The water may be atomized by vibrating the transducer in an atomization mode, and agitated, with no or little atomization thereof, by vibrating the transducer in an agitation mode. In the atomization mode, the transducer is vibrated at a first frequency $f_1$, which may be in the range from 1 to 2 MHz. In the agitation mode, the transducer may be vibrated at a second frequency $f_2$, where $f_1>f_2>0$. Alternatively, in the agitation mode the transducer may be vibrated at the first frequency $f_1$, but with reduced amplitude. Additionally, or alternatively, the duty cycle of the signals output to the transducer may be varied between the atomization and agitation modes.

The agitation of the stored water may be performed simultaneously by the transducer and by the air flow conveyed to the reservoir. Alternatively, the agitation of the stored water may be performed by one of the transducer and the air flow. Therefore, in a third aspect the present invention provides a method of generating a humid air flow, comprising the steps of irradiating water stored in a reservoir with ultraviolet radiation, conveying an air flow over water stored in the reservoir, and vibrating a transducer in an atomization mode to atomize water stored in the reservoir to humidify the air flow, wherein, before the water is atomized, the transducer is vibrated in an agitation mode to agitate water stored in the reservoir for a period of time during which stored water is irradiated with ultraviolet radiation.

When atomization is not required, for example when the detected humidity is above the first level, the mode of vibration of the transducer may be changed. This mode of operation may be the same as, or different from, the agitation mode. For example, the vibration of the transducer may be suspended when atomization is not required.

A threshold inhibitor, such as a polyphosphate, may be introduced to the stored water to inhibit the precipitation of limescale on the surfaces of the atomization device and the UV transparent tube or window which are in contact with stored water. The polyphosphate forms a thin coating on the aforementioned surfaces which prevents precipitation of limescale thereon. Where the atomization is performed by a transducer, the presence of this coating has been found to increase significantly the lifetime of the transducer. An amount of polyphosphate may be stored within a chamber located between the water tank and the reservoir and through which the water passes to the reservoir so that the polyphosphate is added to the water entering the reservoir. As water passes over the polyphosphate stored within the chamber, the polyphosphate gradually dissolves, and so a barrier may be provided upstream from the reservoir for preventing relatively large amounts of polyphosphate from entering the reservoir and becoming deposited on the transducer. This barrier may be in the form of a mesh located between the chamber or the reservoir, or in the form of a wall located in the chamber or between the bottom wall of the chamber and an outlet through which water is exhausted from the chamber. The outlet may comprise a plurality of apertures formed in a side wall of the chamber. The chamber may be located immediately beneath the water tank so that water pours into the chamber when the water tank is mounted on the reservoir. An upper wall of the chamber may comprise an inlet through which water enters the chamber from the water tank, and through which air is displaced as the chamber fills with water. The outlet of the chamber is preferably located beneath the inlet of the chamber.

In a fourth aspect the present invention provides humidifying apparatus comprising a housing comprising a water reservoir, a water tank mounted on the housing for supplying water to the reservoir, air flow generating means for generating an air flow over water in the reservoir, an air outlet for emitting at least part of the air flow, atomizing means for atomizing water in the reservoir, irradiating means for irradiating water in the reservoir with ultraviolet radiation, and a chamber for conveying water from the water tank to the reservoir, the chamber containing a threshold inhibitor.

In a fifth aspect the present invention provides humidifying apparatus comprising a housing comprising a water reservoir, a water tank mounted on the housing for supplying water to the reservoir, air flow generating means for generating an air flow over water in the reservoir, an air outlet for emitting at least part of the air flow, atomizing means for atomizing water in the reservoir, irradiating means for irradiating water in the reservoir with ultraviolet radiation, and guide means for guiding a flow of water entering the reservoir adjacent to the irradiating means.

The present invention extends to humidifying apparatus for performing any of the above methods for generating a humid air flow.

In a sixth aspect, the present invention provides humidifying apparatus comprising a housing comprising a water reservoir, air flow generating means for generating an air flow over water in the reservoir, an air outlet for emitting at least part of the air flow, atomizing means for atomizing water in the reservoir, irradiating means for irradiating water in the reservoir with ultraviolet radiation, and control means for controlling the actuation of the air flow generating means, the atomizing means and the irradiating means, wherein the control means is configured to actuate the air flow generating means and the irradiating means for a period of time prior to the actuation of the atomizing means.

As mentioned above, the atomizing means may comprise at least one transducer, and so the control means may be configured to actuate vibration of the transducer in an atomization mode, and to actuate vibration of the transducer in an agitation mode, different from the atomization mode, during said period of time to agitate the stored water. Therefore, in a seventh aspect the present invention provides humidifying apparatus comprising a housing comprising a water reservoir, air flow generating means for generating an air flow over water in the reservoir, an air outlet for emitting at least part of the air flow, atomizing means for atomizing water in the reservoir, the atomizing means comprising a transducer, irradiating means for irradiating water in the reservoir with ultraviolet radiation, and control means for controlling the actuation of the air flow generating means and the irradiating means, and for controlling the frequency of vibration of the transducer, wherein the control means is configured to actuate vibration of the transducer in an atomization mode to atomize water, and to actuate simultaneously the irradiating means and vibration of the transducer in an agitation mode to agitate water in the reservoir for a period of time prior to the actuation of the vibration of the transducer in the atomization mode.

The control means may comprise one or more control circuits or drive circuits of the humidifying apparatus, and which may each comprise a separate processor. For example, a drive circuit may be located proximate to the transducer, and which is connected to a central drive circuit for operating the air flow generating means and the irradiating means. The air flow generating means preferably comprises an impeller and a motor for rotating the impeller to generate the air flow. The irradiating means preferably comprises a UV radiation generator, such as a UV lamp.

The air outlet may be located on the housing. Alternatively, the air outlet may be located on a nozzle mounted on the housing. The nozzle is preferably annular in shape, and extends about a bore through which air from outside the humidifying apparatus is drawn by air emitted from the air outlet. The air outlet may be located in a front end of the nozzle. The air outlet may comprise a plurality of apertures each for emitting a respective humid air stream, and each aperture may be located on a respective side of the bore. Alternatively, the nozzle may comprise a single air outlet extending about the bore. The nozzle may comprise an air inlet for receiving the humid air flow, and an interior passage extending about the bore for conveying the air flow to the, or each, air outlet. The interior passage may surround the bore of the nozzle.

The nozzle may be arranged to emit both the humid air flow, and a separate air flow for conveying the humid air flow away from the humidifying apparatus. This can enable the humid air flow to be experienced rapidly at a distance from the humidifying apparatus. This separate air flow may be generated by the air flow generating means which generates the air flow over the reservoir. For example, the housing may comprise a first air passageway for conveying the separate air flow to the nozzle and a second air passageway for conveying the humid air flow to the nozzle. This second air passageway may be defined by the inlet and outlet ducts which convey air to and from the reservoir. The first air passageway preferably extends from an air inlet of the housing to a first air inlet of the nozzle. The second air passageway may be arranged to receive air directly from the air inlet of the housing. Alternatively, the second air passageway may be arranged to receive air from the first air passageway. In this case, the junction between the air passageways may be located downstream or upstream from the air flow generating means. An advantage of locating the junction downstream from the air flow generating means is that the flow generating means may comprise a single impeller and a motor for generating an air flow which is divided into two air flows downstream from the impeller.

The nozzle may thus comprise at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, with the nozzle defining a bore through which air from outside the humidifying apparatus is drawn by air emitted from the nozzle.

In an eighth aspect the present invention provides humidifying apparatus comprising a nozzle comprising at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore through which air from outside the humidifying apparatus is drawn by air emitted from the nozzle, and a body on which the nozzle is mounted, the body comprising air flow generating means for generating a first air flow through the first interior passage and a second air flow through the second interior passage, a water reservoir, a first air passageway for conveying the first air flow to the at least one first air inlet, a second air passageway for conveying the second air flow over water in the reservoir to the at least one second air inlet, atomizing means for atomizing water in the reservoir to increase the humidity of the second air flow, irradiating means for irradiating water in the reservoir with ultraviolet radiation, and control means for controlling the actuation of the air flow generating means, the atomizing means and the irradiating means, wherein the control means is configured to actuate the air flow generating means and the irradiating means for a period of time prior to the actuation of the atomizing means.

The nozzle may thus be arranged to emit both the moistened second air flow and the first air flow which carries the moistened air flow into the environment. The moistened second air flow can be emitted from one or more different air outlets of the nozzle. These air outlets may be positioned, for example, about the bore of the nozzle to allow the moistened air flow to be dispersed relatively evenly within the first air flow.

Preferably, the first air flow is emitted at a first air flow rate and the second air flow is emitted at a second air flow rate which is lower than the first air flow rate. The first air flow rate may be a variable air flow rate, and so the second air flow rate may vary with the first air flow rate.

The first air outlet(s) are preferably located behind the second air outlet(s) so that the second air flow is conveyed away from the nozzle within the first air flow. Each interior passage is preferably annular. The two interior passages of the nozzle may be defined by respective components of the nozzle, which may be connected together during assembly. Alternatively, the interior passages of the nozzle may be separated by a dividing wall or other partitioning member located between inner and outer walls of the nozzle. As mentioned above, the first interior passage is preferably isolated from the second interior passage, but a relatively small amount of air may be bled from the first interior passage to the second interior passage to urge the second air flow through the second air outlet(s) of the nozzle.

As the flow rate of the first air flow is preferably greater than the flow rate of the second air flow, the volume of the first interior passage of the nozzle is preferably greater than the volume of the second interior passage of the nozzle.

The nozzle may comprise a single first air outlet, which preferably extends at least partially about the bore of the nozzle, and is preferably centred on the axis of the bore. Alternatively, the nozzle may comprise a plurality of first air outlets which are arranged about the bore of the nozzle. For example, the first air outlets may be located on opposite sides of the bore. The first air outlet(s) are preferably arranged to emit air through at least a front part of the bore. The first air outlet(s) may be arranged to emit air over a surface defining part of the bore to maximise the volume of air which is drawn through the bore by the air emitted from the first air outlet(s). Alternatively, the first air outlet(s) may be arranged to emit the air flow from an end surface of the nozzle.

The second air outlet(s) of the nozzle may be arranged to emit the second air flow over this surface of the nozzle. Alternatively, the second air outlet(s) may be located in a front end of the nozzle, and arranged to emit air away from the surfaces of the nozzle. The first air outlet(s) may therefore be located adjacent to the second air outlet(s). The nozzle may comprise a single second air outlet, which may extend at least partially about the axis of the nozzle. Alternatively, the nozzle may comprise a plurality of second air outlets, which may be arranged about the front end of the nozzle. For example, the second air outlets may be located on opposite sides of the front end of the nozzle. Each of the plurality of air outlets may comprise one or more apertures, for example, a slot, a plurality of linearly aligned slots, or a plurality of apertures. The first air outlets may extend parallel to the second air outlets.

As mentioned above, the body may comprise a removable water tank for supplying water to the reservoir. To provide the body with a compact appearance, the water tank preferably extends about the flow generating means. In a preferred embodiment, the water tank surrounds the flow generating means. The water tank may surround at least part of the first air passageway, and at least part of the second air passageway. The body may comprise a base comprising an air inlet through which air enters the humidifying apparatus, and the water tank may be mounted on the base. Preferably, the base and the water tank each have a cylindrical outer surface, and the outer surfaces of the base and the water tank have substantially the same radius. This can further contribute towards the compact appearance of the humidifying apparatus.

The nozzle may be mounted on the body so that the water tank surrounds a lower section of the interior passages of the nozzle. For example, the water tank may have an upper wall which is upwardly curved or concave in shape, and the nozzle may be mounted centrally on the water tank so that the upper wall extends around a lower part of the nozzle. This can allow the humidifying apparatus to have a compact appearance, and can allow the capacity of the water tank to be maximised.

The body may comprise means for releasably retaining the nozzle on the body. For example, the body may comprise a detent which is locatable at least partially within a recess located on the nozzle to retain the nozzle on the water tank. The body may comprise a catch which is operable to move the detent away from the recess to release the nozzle from the body. This can allow the nozzle to be removed from the body before the water tank is removed from the base, for example to refill the water tank. The catch may be moveable between a first position and a second position to move the detent away from the recess. The body may comprise means for retaining the catch in the second position until the nozzle is replaced on the body. For example, the body may comprise a wedge, hook or other profiled member for retaining the catch in the second position.

The water tank may comprise a handle which is moveable between a stowed position and a deployed position to facilitate the removal of the water tank from the base. The water tank may comprise a spring or other resilient element for urging the handle towards the deployed position. As the nozzle is replaced on the body, the nozzle may engage the handle to move the handle, against the biasing force of the resilient element, towards its first position. As the handle moves towards the stowed position, the handle may engage the catch to urge the catch away from the wedge to release the catch from its second position. The detent is preferably biased towards a deployed position for retaining the nozzle. The release of the catch from the second position can allow the detent to move automatically to its deployed position.

Features described above in connection with the first aspect of the invention are equally applicable to each of the second to eighth aspects of the invention, and vice versa.

BRIEF DESCRIPTION OF THE INVENTION

An embodiment of the present invention will now be described, by way of example only, with reference to the accompanying drawings, in which:

FIG. 6(a) is a perspective view, from above, of the base of the humidifying apparatus with an outer wall of the base partially removed, and FIG. 6(b) is a similar view to FIG. 6(a) following a partial rotation of the base;

FIG. 7(a) is a perspective rear view, from above, of the water tank mounted on the base, with the handle in a deployed position, and FIG. 7(b) is a close-up of area R indicated in FIG. 7(a);

DETAILED DESCRIPTION OF THE INVENTION

Figure 1:
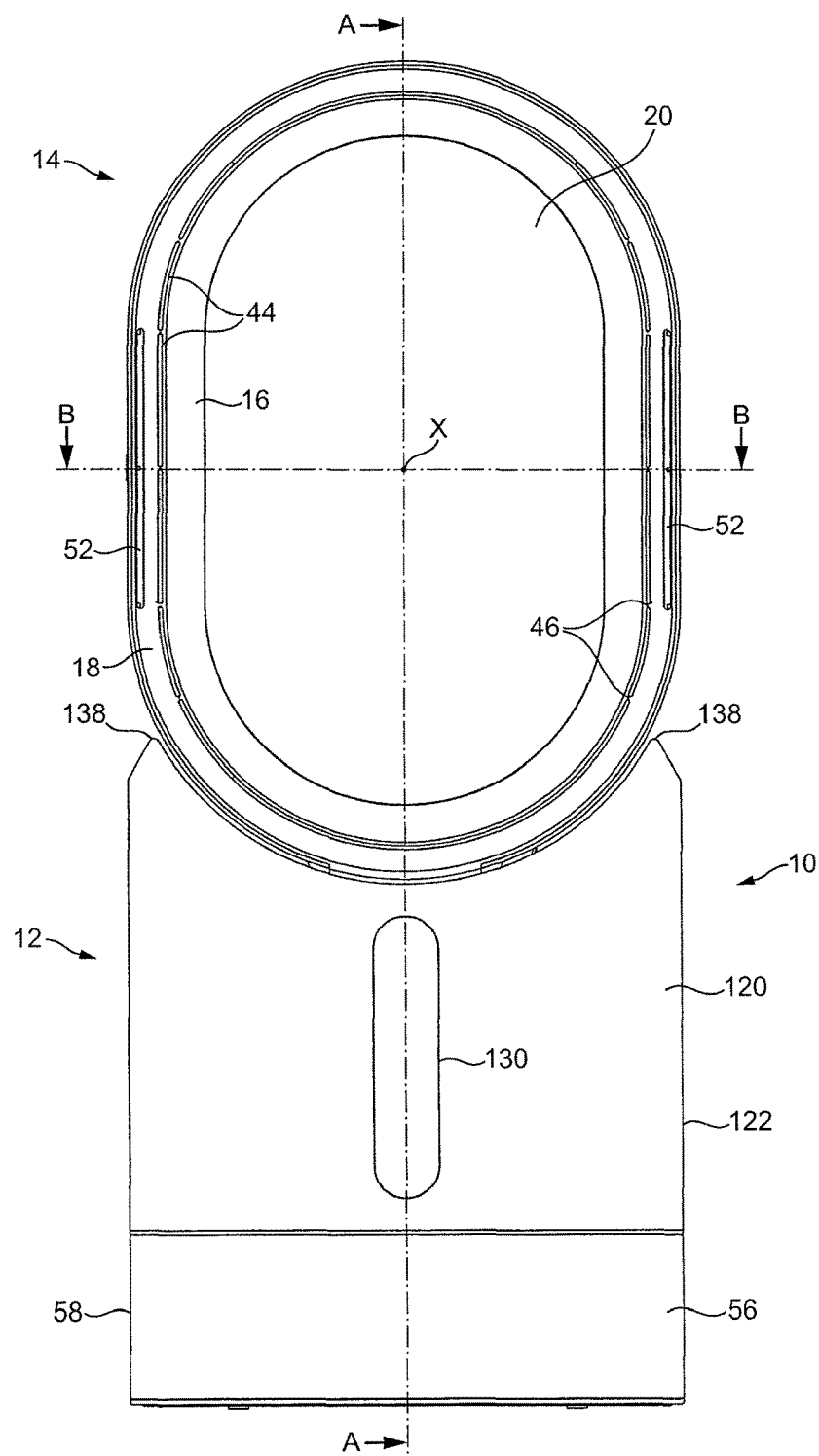
FIG. 1 is a front view of a humidifying apparatus.
Figure 2:
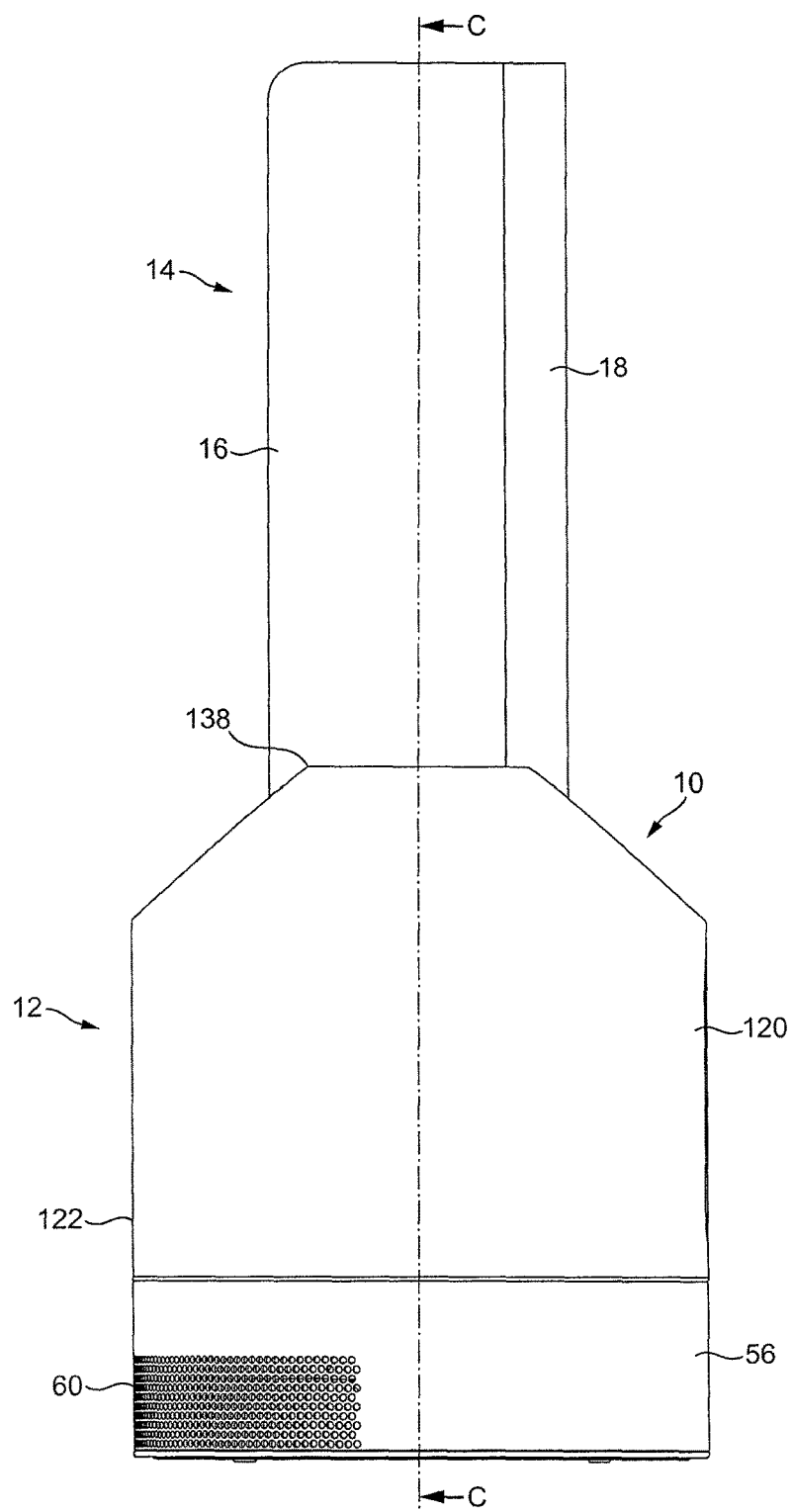
FIG. 2 is a side view of the humidifying apparatus.
Figure 3:
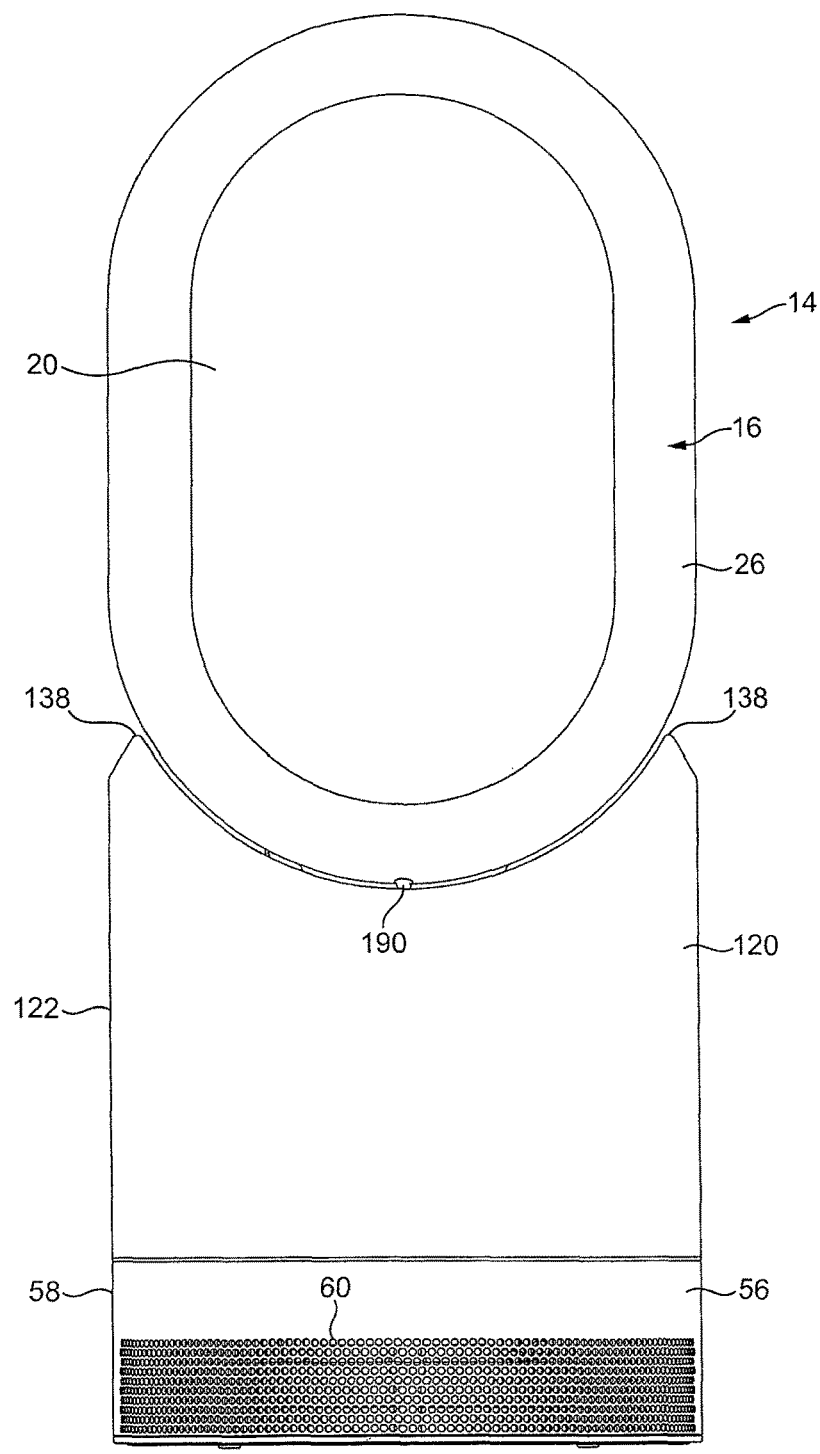
FIG. 3 is a rear view of the humidifying apparatus.

FIGS. 1 to 3 are external views of a fan assembly. In this example, the fan assembly is in the form of a humidifying apparatus 10. In overview, the humidifying apparatus 10 comprises a body 12 comprising an air inlet through which air enters the humidifying apparatus 10, and a nozzle 14 in the form of an annular casing mounted on the body 12, and which comprises a plurality of air outlets for emitting air from the humidifying apparatus 10.

The nozzle 14 is arranged to emit two different air flows. The nozzle 14 comprises a rear section 16 and a front section 18 connected to the rear section 16. Each section 16, 18 is annular in shape, and extends about a bore 20 of the nozzle 14. The bore 20 extends centrally through the nozzle 14 so that the centre of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle 14.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

Figure 4A:
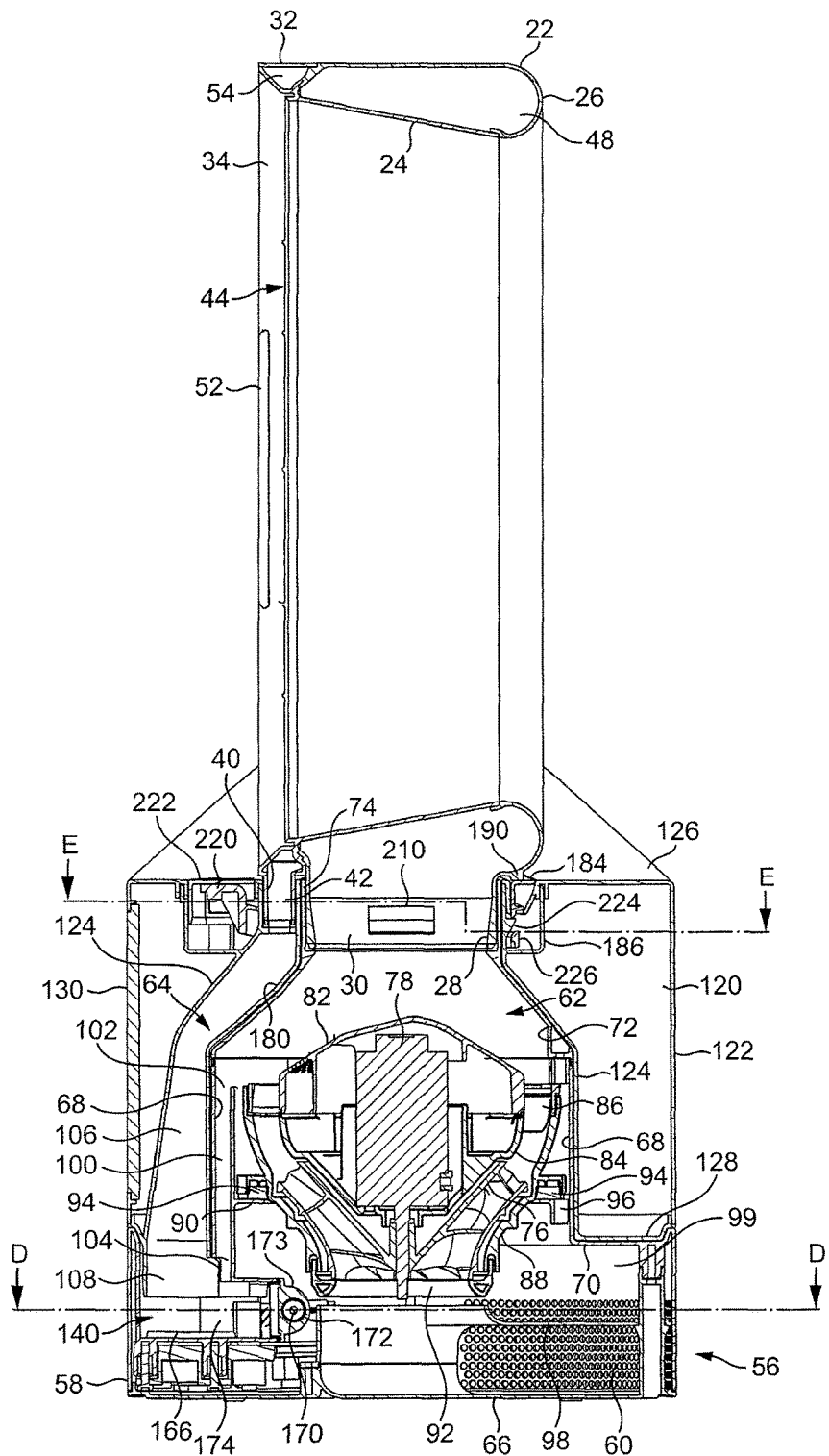
FIG. 4(a) is a side sectional view taken along line A-A in FIG. 1, with the nozzle of the humidifying apparatus retained on the body.
Figure 5B:
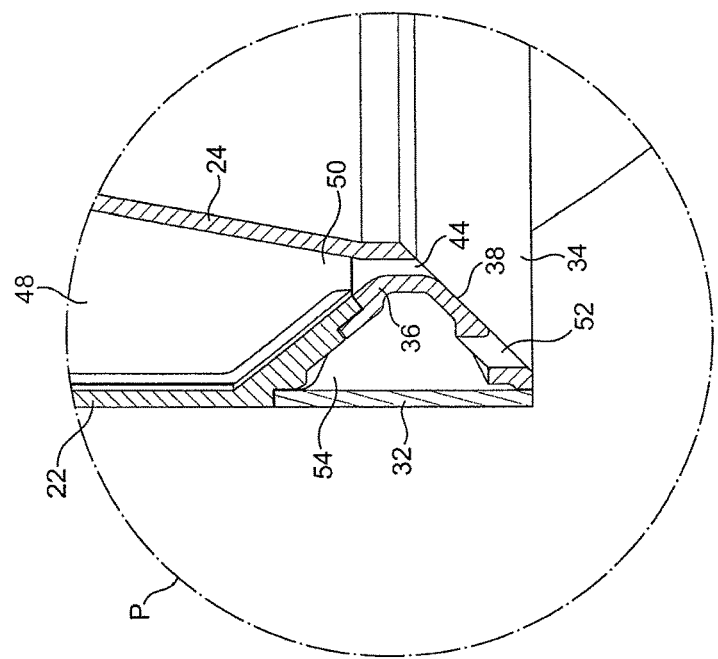
FIG. 5(b) is a close-up of area P indicated in FIG. 5(a)
Figure 5A:
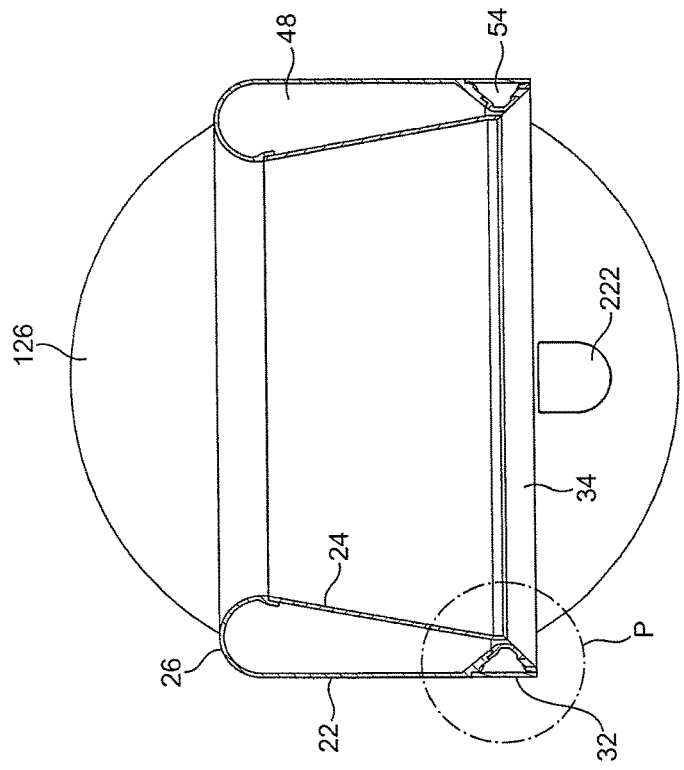
FIG. 5(a) is a top sectional view taken along line B-B in FIG. 1.
Figure 8:
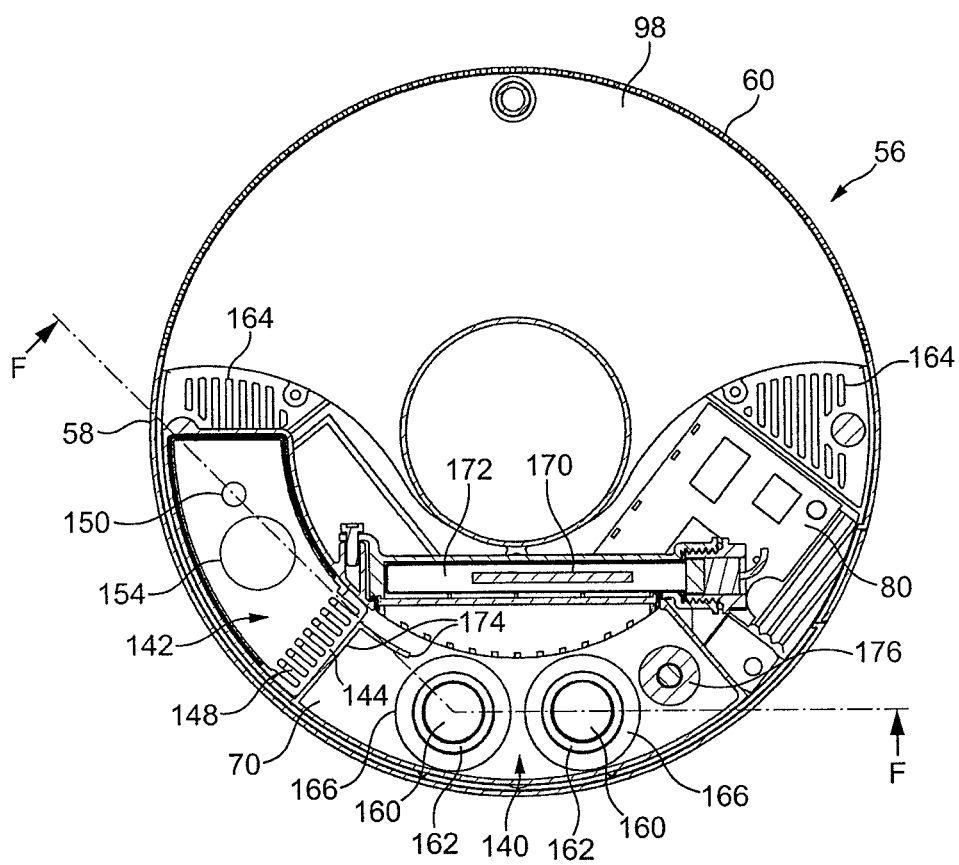
FIG. 8 is a top sectional view taken along line D-D in FIG. 4(a)

With reference also to FIG. 4(a), the rear section 16 of the nozzle 14 comprises an annular first outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single moulded part. As illustrated in FIGS. 5(a) and 5(b), a rear portion 26 of the first outer casing section 22 is curved inwardly towards the bore axis X to define a rear end of the nozzle 14 and a rear part of the bore 20. During assembly the end of the rear portion 26 of the first outer casing section 22 is connected to the rear end of the inner casing section 24, for example using an adhesive. The first outer casing section 22 comprises a tubular base 28 which defines a first air inlet 30 of the nozzle 14.

The front section 18 of the nozzle 14 also comprises an annular second outer casing section 32 connected to and extending about an annular front casing section 34. Again, each casing section 32, 34 extends about the bore axis X, and may be formed from a plurality of connected parts, but in this embodiment each casing section 32, 34 is formed from a respective, single moulded part. In this example, the front casing section 34 comprises a rear portion 36 which is connected to the front end of the outer casing section 22, and a front portion 38 which is generally frusto-conical in shape and flared outwardly from the rear portion 36 away from the bore axis X. The front casing section 34 may be integral with the inner casing section 24. The second outer casing section 32 is generally cylindrical in shape, and extends between the first outer casing section 22 and the front end of the front casing section 34. The second outer casing section 32 comprises a tubular base 40 which defines a second air inlet 42 of the nozzle 14.

The casing sections 24, 34 together define a first air outlet 44 of the nozzle 14. The first air outlet 44 is defined by overlapping, or facing, surfaces of the inner casing section 24 and the rear portion 36 of the front casing section 34 so that the first air outlet 44 is arranged to emit air from a front end of the nozzle 14. The first air outlet 44 is in the form of an annular slot, which has a relatively constant width in the range from 0.5 to 5 mm about the bore axis X. In this example the first air outlet 44 has a width of around 1 mm. Where the inner casing sections 24, 34 are formed from respective components, spacers 46 may be spaced along the first air outlet 44 for urging apart the overlapping portions of the casing sections 24, 34 to control the width of the first air outlet 44. These spacers may be integral with either of the casing sections 24, 34. Where the casing sections 24, 34 are formed from a single component, the spacers 46 are replaced by fins which are spaced along the first air outlet 44 for connecting together the inner casing section 24 and the front casing section 34.

The nozzle 14 defines an annular first interior passage 48 for conveying the first air flow from the first air inlet 30 to the first air outlet 44. The first interior passage 48 is defined by the internal surface of the first outer casing section 22 and the internal surface of the inner casing section 24. A tapering, annular mouth 50 guides the first air flow to the first air outlet 44. The tapering shape of the mouth 50 provides for a smooth, controlled acceleration of air as it passes from the first interior passage 48 to the first air outlet 44. A first air flow path through the nozzle 14 may therefore be considered to be formed from the first air inlet 30, the first interior passage 48, the mouth 50 and the first air outlet 40.

The front casing section 34 defines a plurality of second air outlets 52 of the nozzle 14. The second air outlets 52 are also formed in the front end of the nozzle 14, each on a respective side of the bore 20, for example by moulding or machining. Each of the second air outlets 52 is located downstream from the first air outlet 44. In this example, each second air outlet 52 is in the form of a slot having a relatively constant width in the range from 0.5 to 5 mm. In this example each second air outlet 52 has a width of around 1 mm. Alternatively, each second air outlet 52 may be in the form of a row of circular apertures or slots formed in the front casing section 34 of the nozzle 14.

The nozzle 14 defines an annular second interior passage 54 for conveying the second air flow from the second air inlet 42 to the second air outlets 52. The second interior passage 54 is defined by the internal surfaces of the casing sections 32, 34, and by the front part of the external surface of the first outer casing section 22. The second interior passage 54 is isolated within the nozzle 14 from the first interior passage 48. A second air flow path through the nozzle 14 may therefore be considered to be formed by the second air inlet 42, the second interior passage 54 and the second air outlets 52.

Returning to FIG. 4(a) the body 12 is generally cylindrical in shape. The body 12 comprises a base 56. The base 56 has an external outer wall 58 which is cylindrical in shape, and which comprises an air inlet 60. In this example, the air inlet 60 comprises a plurality of apertures formed in the outer wall 58 of the base 56. A front portion of the base 56 may comprise a user interface of the humidifying apparatus 10. The user interface is illustrated schematically in FIG. 13, and described in more detail below. A mains power cable (not shown) for supplying electrical power to the humidifying apparatus 10 extends through an aperture formed in the base 56.

The base 56 comprises a first air passageway 62 for conveying a first air flow to the first air flow path through the nozzle 14, and a second air passageway 64 for conveying a second air flow to the second air flow path through the nozzle 14.

The first air passageway 62 passes through the base 56 from the air inlet 60 to the first air inlet 30 of the nozzle 14. With reference also to FIGS. 6(a) and 6(b), the base 56 comprises a bottom wall 66 connected to the lower end of the outer wall 58, and a generally cylindrical inner wall 68 connected to the outer wall 58 by a recessed annular wall 70. The inner wall 68 extends upwardly away from the annular wall 70. In this example, the outer wall 58, inner wall 68 and annular wall 70 are formed as a single component of the base 56, but alternatively two or more of these walls may be formed as a respective component of the base 56. An upper wall is connected to the upper end of the inner wall 68. The upper wall has a lower frusto-conical section 72 and an upper cylindrical section 74 into which the base 28 of the nozzle 14 is inserted.

The inner wall 68 extends about an impeller 76 for generating a first air flow through the first air passageway 62. In this example the impeller 76 is in the form of a mixed flow impeller. The impeller 76 is connected to a rotary shaft extending outwardly from a motor 78 for driving the impeller 76. In this embodiment, the motor 78 is a DC brushless motor having a speed which is variable by a drive circuit 80 in response to a speed selection by a user. The maximum speed of the motor 78 is preferably in the range from 5,000 to 10,000 rpm. The motor 78 is housed within a motor bucket comprising an upper portion 82 connected to a lower portion 84. The upper portion 82 of the motor bucket comprises a diffuser 86 in the form of a stationary disc having curved blades. The diffuser 86 is located beneath the first air inlet 30 of the nozzle 14.

The motor bucket is located within, and mounted on, a generally frusto-conical impeller housing 88. The impeller housing 88 is, in turn, mounted on an annular support 90 extending inwardly from the inner wall 68. An annular inlet member 92 is connected to the bottom of the impeller housing 88 for guiding the air flow into the impeller housing 88. An annular sealing member 94 is located between the impeller housing 88 and the annular support 90 to prevent air from passing around the outer surface of the impeller housing 88 to the inlet member 92. The annular support 90 preferably comprises a guide portion 96 for guiding an electrical cable from the drive circuit 80 to the motor 78. The base 56 also includes a guide wall 98 for guiding air flow the air inlet 60 to an air inlet port of the inlet member 92.

The first air passageway 62 extends from the air inlet 60 to the air inlet port of the inlet member 92. The first air passageway 62 extends, in turn, through the impeller housing 88, the upper end of the inner wall 68 and the sections 72, 74 of the upper wall.

An annular cavity 99 is located between the guide wall 98 and the annular wall 70. The cavity 99 has an opening which is located between the inlet member 92 and the guide wall 98 so that the cavity 99 is open to the first air passageway 62. The cavity 99 contains a static pocket of air which serves to reduce the transmission of vibrations generated during use of the humidifying apparatus 10 to the outer surface of the body 12.

The second air passageway 64 is arranged to receive air from the first air passageway 62. The second air passageway 64 is located adjacent to the first air passageway 62. The second air passageway 64 comprises an inlet duct 100. With reference to FIGS. 6(a) and 6(b), the inlet duct 100 is defined by the inner wall 68 of the base 56. The inlet duct 100 is located adjacent to, and in this example radially external of, part of the first air passageway 62. The inlet duct 100 extends generally parallel to the longitudinal axis of the base 56, which is co-linear with the rotational axis of the impeller 76. The inlet duct 100 has an inlet port 102 located downstream from, and radially outward from, the diffuser 86 so as to receive part of the air flow emitted from the diffuser 86, and which forms the second air flow. The inlet duct 100 has an outlet port 104 located at the lower end thereof.

The second air passageway 64 further comprises an outlet duct 106 which is arranged to convey the second air flow to the second air inlet 42 of the nozzle 14. The second air flow is conveyed through the inlet duct 100 and the outlet duct 106 in generally opposite directions. The outlet duct 106 comprises an inlet port 108 located at the lower end thereof, and an outlet port located at the upper end thereof. The base 40 of the second outer casing section 32 of the nozzle 14 is inserted into the outlet port of the outlet duct 106 to receive the second air flow from the outlet duct 106.

The humidifying apparatus 10 is configured to increase the humidity of the second air flow before it enters the nozzle 14. With reference now to FIGS. 1 to 4(*a*) and FIG. 7, the humidifying apparatus 10 comprises a water tank 120 removably mountable on the base 56. The base 56 and the water tank 120 together form the body 12 of humidifying apparatus 10. The water tank 120 has a cylindrical outer wall 122 which has the same radius as the outer wall 58 of the base 56 of the body 12 so that the body 12 has a cylindrical appearance when the water tank 120 is mounted on the base 56. The water tank 120 has a tubular inner wall 124 which surrounds the walls 68, 72, 74 of the base 56 when the water tank 120 is mounted on the base 56. The outer wall 122 and the inner wall 124 define, with an annular upper wall 126 and an annular lower wall 128 of the water tank 120, an annular volume for storing water. The water tank 120 thus surrounds the impeller 76 and the motor 78, and so at least part of the first air passageway 62, when the water tank 120 is mounted on the base 56. The lower wall 128 of the water tank 120 engages the outer wall 58 of the base 56, and non-recessed parts of the annular wall 70, when the water tank 120 is mounted on the base 56.

The water tank 120 preferably has a capacity in the range from 2 to 4 litres. A window 130 is provided on the outer wall 122 of the water tank 120 to allow a user to see the level of water within the water tank 120 when it is disposed on the base 56.

Figure 9:
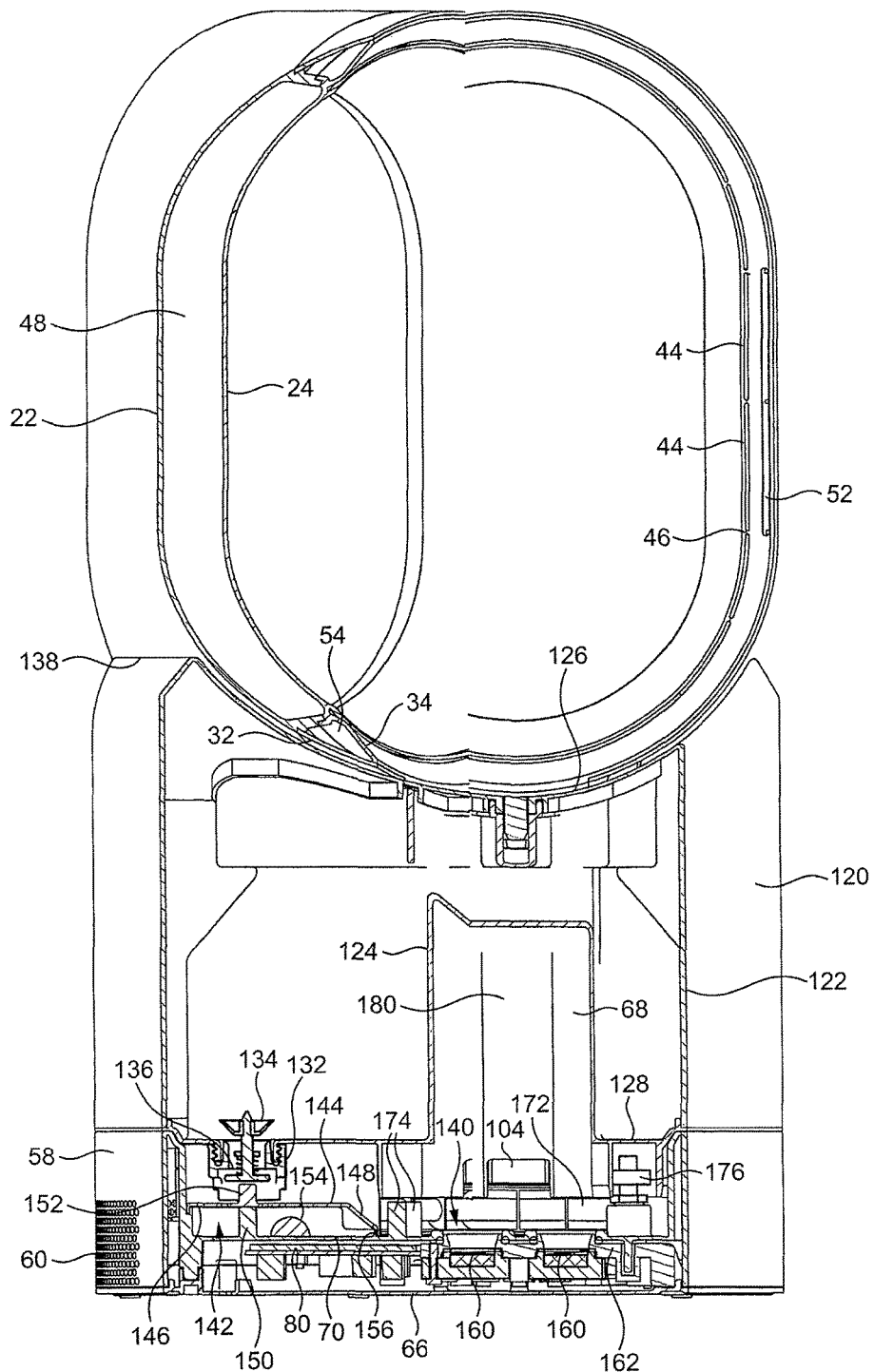
FIG. 9 is a sectional view take along line F-F in FIG. 8.

With reference to FIG. 9, a spout 132 is removably connected to the lower wall 128 of the water tank 120, for example through co-operating threaded connections. In this example the water tank 120 is filled by removing the water tank 120 from the base 56 and inverting the water tank 120 so that the spout 132 is projecting upwardly. The spout 132 is then unscrewed from the water tank 120 and water is introduced into the water tank 120 through an aperture exposed when the spout 132 is disconnected from the water tank 120. Once the water tank 120 has been filled, the user reconnects the spout 132 to the water tank 120, returns the water tank 120 to its non-inverted orientation and replaces the water tank 120 on the base 56. A spring-loaded valve 134 is located within the spout 132 for preventing leakage of water through a water outlet 136 of the spout 132 when the water tank 120 is re-inverted. The valve 134 is biased towards a position in which a skirt of the valve 134 engages the upper surface of the spout 132 to prevent water entering the spout 132 from the water tank 120.

The upper wall 126 of the water tank 120 comprises one or more supports 138 for supporting the inverted water tank 120 on a work surface, counter top or other support surface. In this example, two parallel supports 138 are formed in the periphery of the upper wall 126 for supporting the inverted water tank 120.

With reference also to FIGS. 6(*a*), 6(*b*) and 8, the outer wall 58, inner wall 68 and the recessed portion of the annular wall 70 of the base 56 define a water reservoir 140 for receiving water from the water tank 120. The base 56 comprises a water treatment chamber 142 for treating water from the water tank 120 before it enters the water reservoir 140. The water treatment chamber 142 is located to one side of the water reservoir 140, within the recessed portion of the annular wall 70. A cover 144 connected to the annular wall 70 comprises a water inlet 146 and a water outlet 148 of the water treatment chamber 142. In this embodiment, each of the water inlet 146 and the water outlet 148 comprises a plurality of apertures. Water outlet 148 is located on an inclined surface of the cover 144 so that the water outlet 148 is located beneath the water inlet 146. The cover 144 is supported by a supporting pin 150 which extends upwardly from the annular wall 70 to engage the lower surface of the cover 144.

An upwardly extending pin 152 of the cover 144 is located between apertures of the water inlet 146. When the water tank 120 is mounted on the base 56, the pin 152 protrudes into the spout 132 to push the valve 134 upwardly to open the spout 132, thereby allowing water to pass under gravity through the water inlet 146 and into the water treatment chamber 142. As the water treatment chamber 142 fills with water, water flows through the water outlet 148 and into the water reservoir 140. The water treatment chamber 142 houses a threshold inhibitor, such one or more beads or pellets 154 of a polyphosphate material, which becomes added to the water as it passes through the water treatment chamber 142. Providing the threshold inhibitor in a solid form means that the threshold inhibitor slowly dissolves with prolonged contact with water in the water treatment chamber 142. In view of this, the water treatment chamber 142 comprises a barrier which prevents relatively large pieces of the threshold inhibitor from entering the water reservoir 140. In this example, the barrier is in the form of a wall 156 located between the annular wall 70 and the water outlet 148.

Within the water reservoir 140, the annular wall 70 comprises a pair of circular apertures each for exposing a respective piezoelectric transducer 160. The drive circuit 80 is configured to actuate vibration of the transducers 160 in an atomization mode to atomise water located in the water reservoir 140. In the atomization mode, the transducers 160 may vibrate ultrasonically at a frequency $f_1$, which may be in the range from 1 to 2 MHz. A metallic heat sink 162 is located between the annular wall 70 and the transducers 160 for conveying heat away from the transducers 160. Apertures 164 are formed in the bottom wall 64 of the base 56 to dissipate heat radiated from the heat sink 162. Annular sealing members form water-tight seals between the transducers 160 and the heat sink 162. As illustrated in FIGS. 6(*a*) and 6(*b*), the peripheral portions 166 of the apertures in the annular wall 70 are raised to present a barrier for preventing any particles of the threshold inhibitor which have entered the water reservoir 140 from the water treatment chamber 142 from becoming lodged on the exposed surfaces of the transducers 160.

The water reservoir 140 also includes an ultraviolet radiation (UV) generator for irradiating water stored in the water reservoir 140. In this example, the UV generator is in the form of a UV lamp 170 located within a UV transparent tube 172 located in the water reservoir 140 so that, as the water reservoir 140 fills with water, water surrounds the tube 172. The tube 172 is located on the opposite side of the water reservoir 140 to the transducers 160. One or more reflective surfaces 173 may be provided adjacent to, and preferably about, the tube 172 for reflecting ultraviolet radiation emitted from the UV lamp 170 into the water reservoir 140. The water reservoir 140 comprises baffle plates 174 which guide water entering the water reservoir 140 from the water treatment chamber 142 along the tube 172 so that, during use, the water entering the water reservoir 140 from the water treatment chamber 142 is irradiated with ultraviolet radiation before it is atomized by one of the transducers 160.

A magnetic level sensor 176 is located within the water reservoir 140 for detecting the level of water within the water reservoir 140. Depending on the volume of water within the water tank 120, the water reservoir 140 and the water treatment chamber 142 can be filled with water to a maximum level which is substantially co-planar with the upper surface of the pin 152. The outlet port 104 of the inlet duct 100 is located above the maximum level of water within the water reservoir 140 so that the second air flow enters the water reservoir 140 over the surface of the water located in the water reservoir 140.

The inlet port 108 of the outlet duct 106 is positioned above the transducers 160 to receive a humidified air flow from the water reservoir 140. The outlet duct 106 is defined by the water tank 120. The outlet duct 106 is formed by the inner wall 124 of the water tank 120 and a curved wall 180 about which the inner wall 124 extends.

Figure 11:
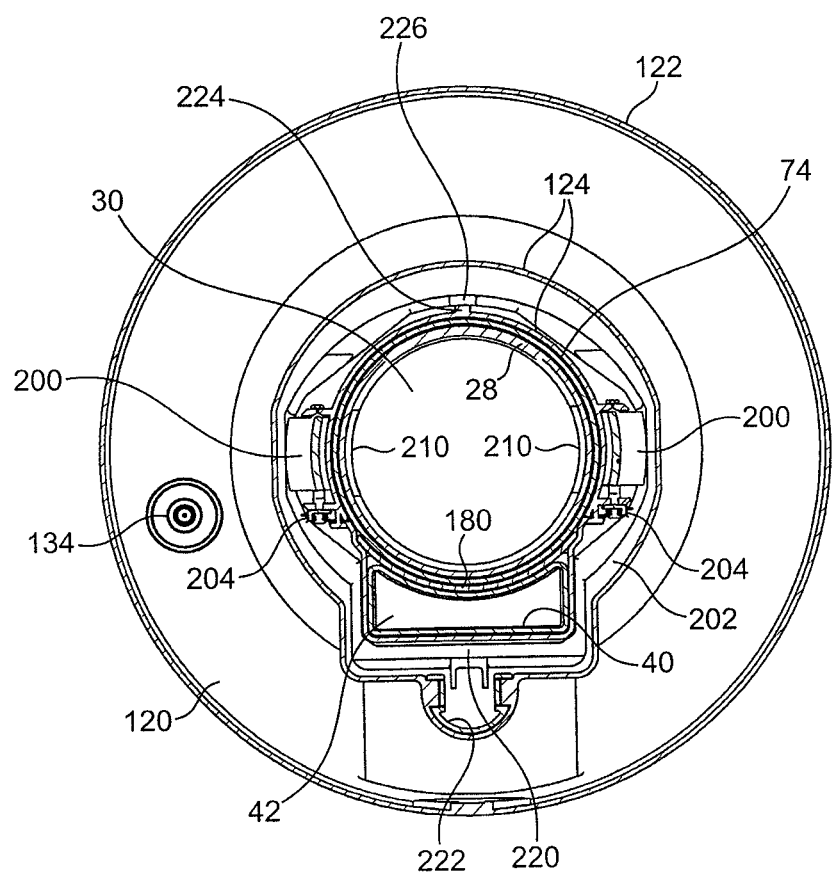
FIG. 11 is a top sectional view taken along line E-E in FIG. 4(a)
Figure 12A:
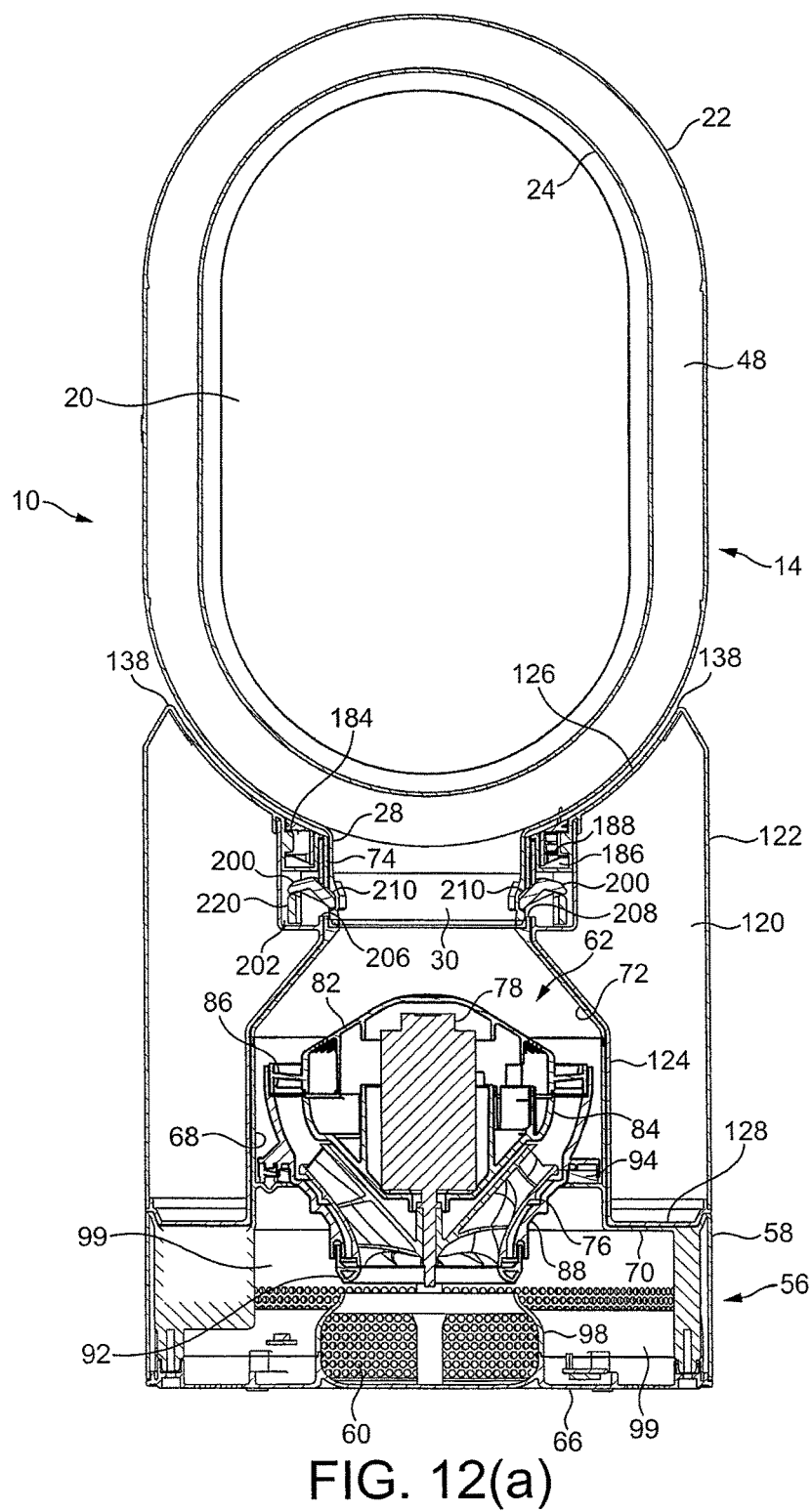
FIG. 12(a) is a front sectional view taken along line C-C in FIG. 2, with the nozzle of the humidifying apparatus retained on the body.
Figure 12B:
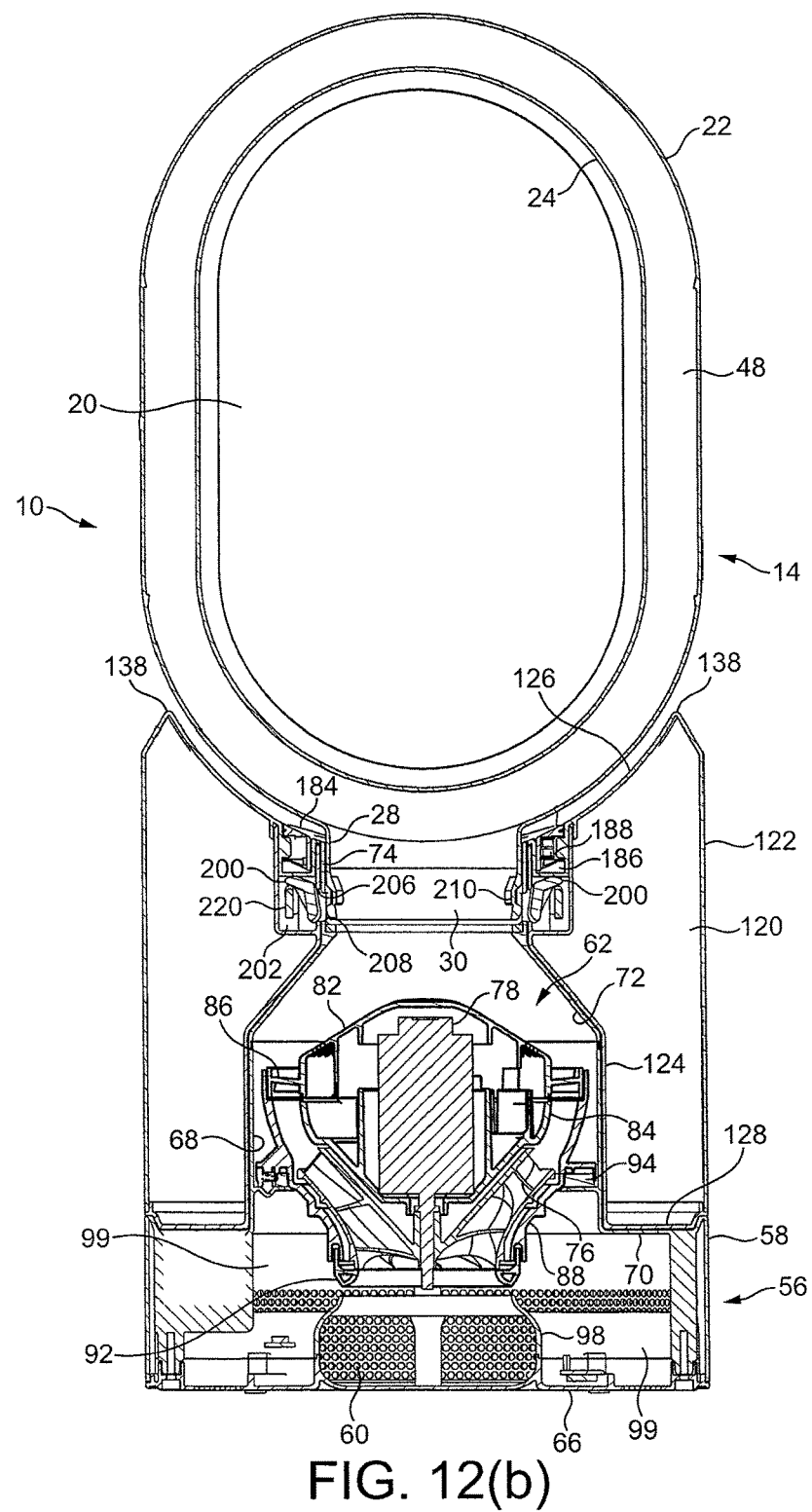
FIG. 12(b) is a similar view to FIG. 12(a) but with the nozzle released from the body.

The base 56 includes a proximity sensor 182 for detecting that the water tank 120 has been mounted on the base 56. The proximity sensor 182 is illustrated schematically in FIG. 13. The proximity sensor 182 may be in the form of a reed switch which interacts with a magnet (not shown) located on the lower wall 128 of the water tank 120 to detect the presence, or absence, of the water tank 120 on the base 56. As illustrated in FIGS. 7(a), 7(b) and 11, when the water tank 120 is mounted on the base 56 the inner wall 124 and the curved wall 180 surround the upper wall of the base 56 to expose the open upper end of the upper cylindrical section 74 of the upper wall. The water tank 120 includes a handle 184 to facilitate removal of the water tank 120 from the base 56. The handle 184 is pivotably connected to the water tank 120 so as to be moveable relative to the water tank 120 between a stowed position, in which the handle 184 is housed within a recessed section 186 of the upper wall 126 of the water tank 120, and a deployed position, in which the handle 184 is raised above the upper wall 126 of the water tank 120. With reference also to FIGS. 12(a) and 12(b), one or more resilient elements 188, such as torsion springs, may be provided for biasing the handle 184 towards its deployed position, as illustrated in FIGS. 7(a) and 7(b).

Figure 10:
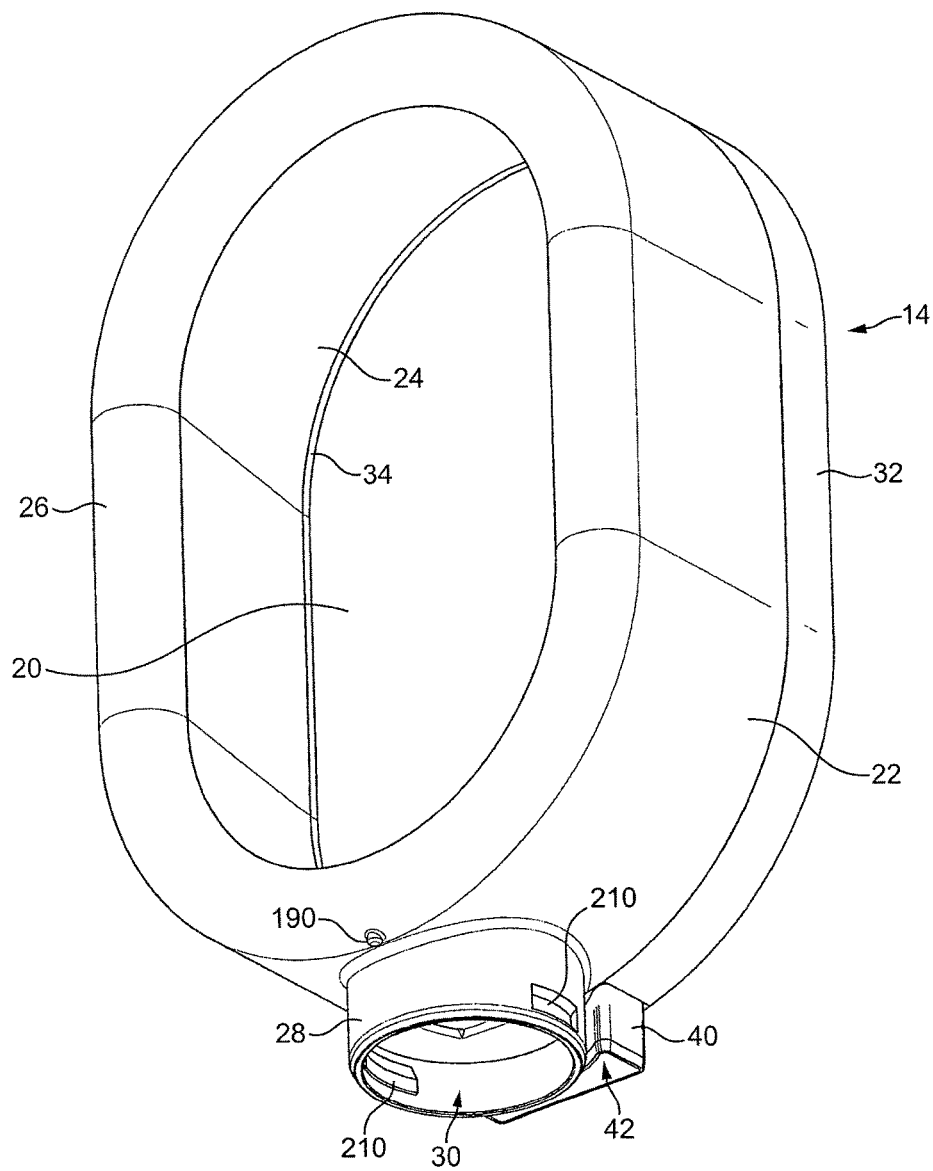
FIG. 10 is a rear perspective view, from below, of the nozzle.

When the nozzle 14 is mounted on the body 12, the base 28 of the first outer casing section 22 of the nozzle 14 is located over the open end of the upper cylindrical section 74 of the upper wall of the base 56, and the base 40 of the second outer casing section 32 of the nozzle 14 is located over the open upper end of the outlet duct 106 of the water tank 120. The user then pushes the nozzle 14 towards the body 12. As illustrated in FIG. 10, a pin 190 is formed on the lower surface of the first outer casing section 22 of the nozzle 14, immediately behind the base 28 of the first outer casing section 22. As the nozzle 14 moves towards the body 12, the pin 190 pushes the handle 184 towards its stowed position, against the biasing force of the resilient elements 188. When the bases 28, 40 of the nozzle 14 are fully inserted in the body 12, annular sealing members 192 form air-tight seals between the ends of the bases 28, 40 and annular ledges 194 formed in the upper cylindrical section 74 of the upper wall of the base 56, and in the outlet duct 106. The upper wall 126 of the water tank 120 has a concave shape so that, when the nozzle 14 is mounted on the body 12, the water tank 120 surrounds a lower part of the nozzle 14. This not only can this allow the capacity of the water tank 120 to be increased, but can also provide the humidifying apparatus 10 with a compact appearance.

Figure 4B:
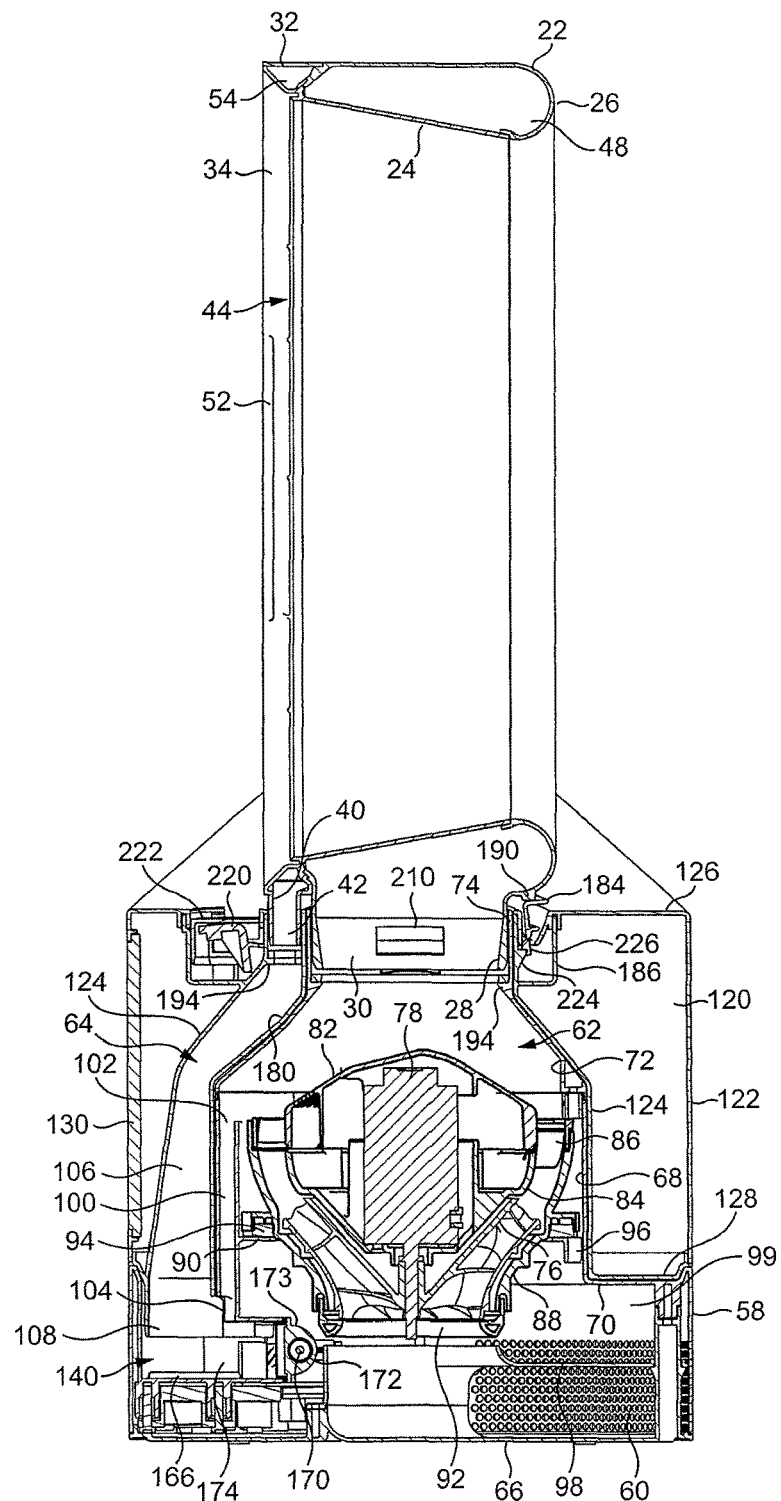
FIG. 4(b) is a similar view to FIG. 4(a) but with the nozzle released from the body.

The body 12 comprises a mechanism for releasably retaining the nozzle 14 on the body 12. FIGS. 4(a), 11 and 12(a) illustrate a first configuration of the mechanism when the nozzle 14 is retained on the body 12, whereas FIGS. 4(b) and 12(b) illustrate a second configuration of the mechanism when the nozzle 14 is released from the body 12. The mechanism for releasably retaining the nozzle 14 on the body 12 comprises a pair of detents 200 which are located on diametrically opposed sides of an annular housing 202. Each detent 200 has a generally L-shaped cross-section. Each detent 200 is pivotably moveable between a deployed position for retaining the nozzle 14 on the body 12, and a stowed position. Resilient elements 204, such as torsion springs, are located within the housing 202 for biasing the detents 200 towards their deployed positions.

In this example, the water tank 120 comprises the mechanism for releasably retaining the nozzle 14 on the body 12. The housing 202 comprises a pair of diametrically opposed apertures 206 which align with similarly shaped apertures 208 formed on the upper cylindrical section 74 of the upper wall of the base 56 when the water tank 120 is mounted on the base 56. The outer surface of the base 28 of the nozzle 14 comprises a pair of diametrically opposed recesses 210 which align with the apertures 206, 208 when the nozzle 14 is mounted on the body 12. When the detents 200 are in their deployed position, the ends of the detents 200 are urged through the apertures 206, 208 by the resilient elements 204 to enter the recesses 210 in the nozzle 14. The ends of the detents 200 engage the recessed outer surface of the base 28 of the nozzle 14 to prevent the nozzle 14 from becoming withdrawn from the body 12, for example if the humidifying apparatus 10 is lifted by a user gripping the nozzle 14.

The body 12 comprises a depressible catch 220 which is operable to move the mechanism from the first configuration to the second configuration, by moving the detents 200 away from the recesses 210 to release the nozzle 14 from the body 12. The catch 220 is mounted within the housing 202 for pivoting movement about an axis which is orthogonal to the axes about which the detents 200 pivot between their stowed and deployed positions. The catch 220 is moveable from a stowed position, as illustrated in FIGS. 4(a), 11 and 12(a), to a deployed position, as illustrated in FIGS. 4(b), 7(a), 7(b) and 12(b), in response to a user depressing a button 222 located on the body 12. In this example, the button 222 is located on the upper wall 126 of the water tank 120 and above a front section of the catch 220. A compression spring or other resilient element may be provided beneath the front section of the catch 220 for urging the catch 220 towards is stowed position. The rotational axis of the catch 220 is located proximate to the front section of the catch so that, as the catch 220 moves towards its deployed position, the catch 220 urges the detents 200 to pivot away from the recesses 210 against the biasing force of the resilient elements 204.

The body 12 is configured to retain the catch 220 in its deployed position when the user releases the button 220. In this example, the housing 202 of the water tank 120 comprises a wedge 224 over which a hook 226 located on the rear section of the catch 220 slides as the catch 220 moves towards its deployed position. In the deployed position, the end of the hook 226 snaps over the tapered side surface of the wedge 224 to engage the upper surface of the wedge 224, resulting in the catch 220 being retained in its deployed position. As the hook 226 moves over the upper surface of the wedge 224, the hook 226 engages the bottom of the handle 184 and urges the handle 184 upwardly away from the recessed section 186 of the water tank 120. This in turn causes the handle 184 to push the nozzle 14 slightly away from the body 12, providing a visual indication to the user that the nozzle 14 has been released from the body 12. As an alternative to having features on the water tank 120 and the catch 220 which co-operate to retain the catch 220 in its deployed position, one or more magnets may be used to retain the catch 220 in its deployed position.

In its deployed position, the catch 220 holds the detents 200 in their stowed positions, as illustrated in FIGS. 4(b) and 12(b), to allow the user to remove the nozzle 14 from the body 12. As the nozzle 14 is lifted from the body 12, the resilient elements 188 urge the handle 184 to its deployed position. The user can then use the handle 184 to lift the water tank 120 from the base 56 to allow the water tank 120 to be filled or cleaned as required.

Once the water tank 120 has been filled or cleaned, the user replaces the water tank 120 on the base 56, and then replaces the nozzle 14 on the body 12. As the bases 28, 40 of the nozzle 14 are pushed into the body 12 the pin 190 on the nozzle 14 engages the handle 184 and pushes the handle 184 back to its stowed position within the recessed section 186 of the water tank 120. As the handle 184 moves to its stowed position, it engages the hook 226 on the catch 220 and pushes the hook 226 away from the upper surface of the wedge 224 to release the catch 220 from its deployed position. As the hook 226 moves away from the wedge 224, the resilient elements 204 urge the detents 200 towards their deployed positions to retain the nozzle 14 on the body 12. As the detents 200 move towards their deployed position, the detents 200 move the catch 220 back to its stowed position.

Figure 13:
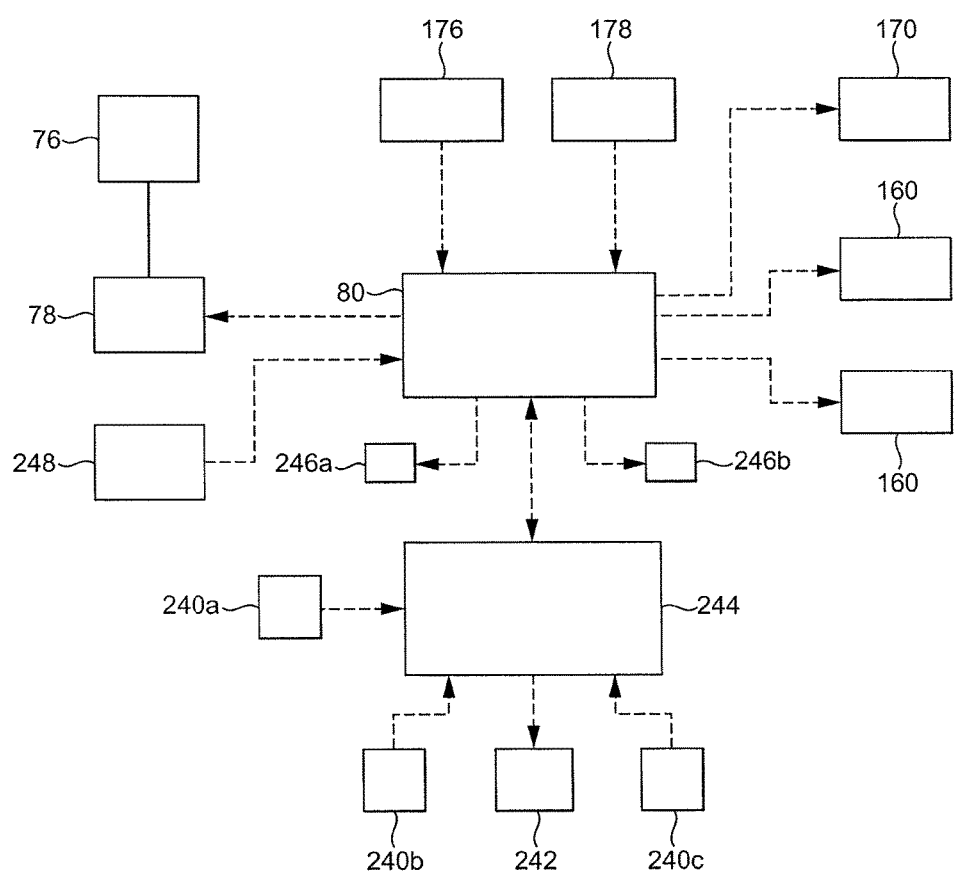
FIG. 13 is a schematic illustration of a control system of the humidifying apparatus.

A user interface for controlling the operation of the humidifying apparatus is located on the outer wall 58 of the base 56 of the body 12. FIG. 13 illustrates schematically a control system for the humidifying apparatus 10, which includes this user interface and other electrical components of the humidifying apparatus 10. In this example, the user interface comprises a plurality of user-operable buttons 240a, 240b and 240c, and a display 242. The first button 240a is used to activate and deactivate the motor 78, and the second button 240b is used to set the speed of the motor 78, and thus the rotational speed of the impeller 76. The third button 240c is used to set a desired level for the relative humidity of the environment in which the humidifying apparatus 10 is located, such as a room, office or other domestic environment. For example, the desired relative humidity level may be selected within a range from 30 to 80% at 20° C. through repeated actuation of the third button 240c. The display 242 provides an indication of the currently selected relative humidity level.

The user interface further comprises a user interface circuit 244 which outputs control signals to the drive circuit 80 upon actuation of one of the buttons, and which receives control signals output by the drive circuit 80. The user interface may also comprise one or more LEDs for providing a visual alert depending on a status of the humidifying apparatus. For example, a first LED 246a may be illuminated by the drive circuit 80 indicating that the water tank 120 has become depleted, as indicated by a signal received by the drive circuit 80 from the level sensor 176.

A humidity sensor 248 is also provided for detecting the relative humidity of air in the external environment, and for supplying a signal indicative of the detected relative humidity to the drive circuit 80. In this example the humidity sensor 248 may be located immediately behind the air inlet 60 to detect the relative humidity of the air flow drawn into the humidifying apparatus 10. The user interface may comprise a second LED 246b which is illuminated by the drive circuit 80 when an output from the humidity sensor 248 indicates that the relative humidity of the air flow entering the humidifying apparatus 10, $H_D$, is at or above the desired relative humidity level, $H_S$, set by the user.

Figure 14:
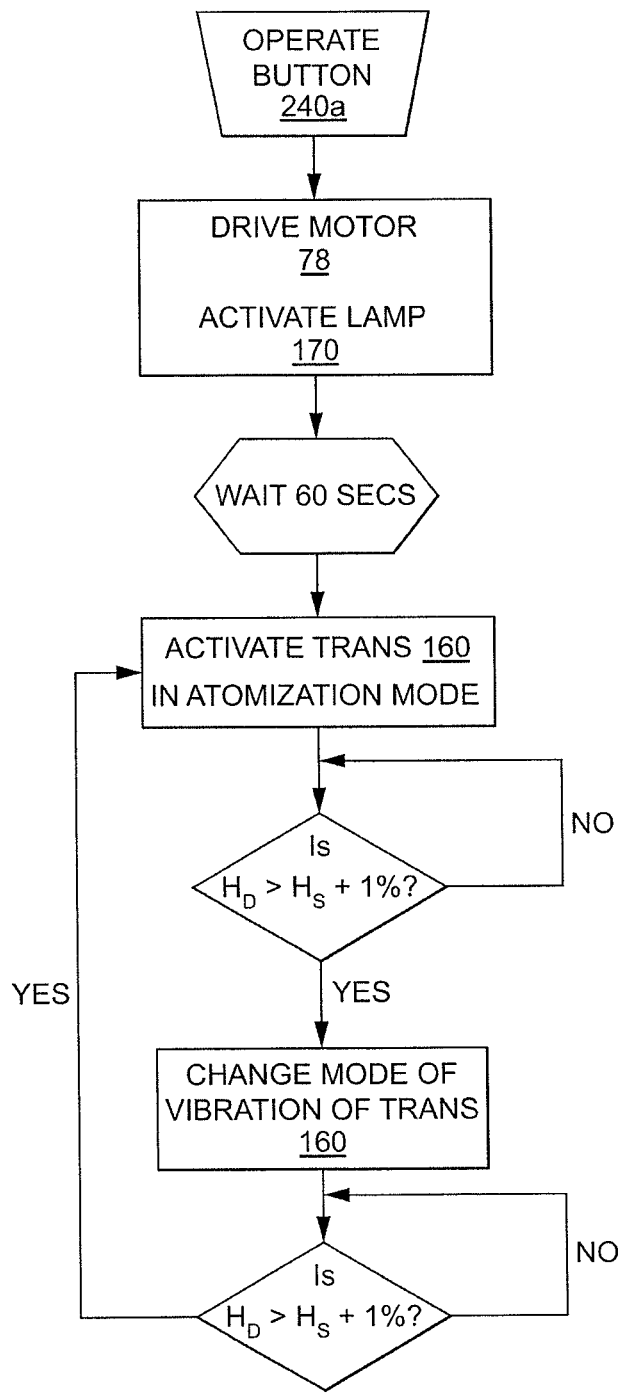
FIG. 14 is a flow diagram illustrating steps in the operation of the humidifying apparatus.

With reference also to FIG. 14, to operate the humidifying apparatus 10, the user actuates the first button 240a. The operation of the button 240a is communicated to the drive circuit 80, in response to which the drive circuit 80 actuates the UV lamp 170 to irradiate water stored in the water reservoir 140. In this example, the drive circuit 80 simultaneously activates the motor 78 to rotate the impeller 76. The rotation of the impeller 76 causes air to be drawn into the body 12 through the air inlet 60. An air flow passes through the impeller housing 88 and the diffuser 86. Downstream from the diffuser 86, a portion of the air emitted from the diffuser 86 enters the inlet duct 100 through the inlet port 102, whereas the remainder of the air emitted from the diffuser 86 is conveyed along the first air passageway 62 to the first air inlet 30 of the nozzle 14. The impeller 76 and the motor 78 may thus be considered to generate a first air flow which is conveyed to the nozzle 14 by the first air passageway 62 and which enters the nozzle 14 through the first air inlet 30.

The first air flow enters the first interior passage 48 at the base of the rear section 16 of the nozzle 14. At the base of the first interior passage 48, the air flow is divided into two air streams which pass in opposite directions around the bore 20 of the nozzle 14. As the air streams pass through the first interior passage 48, air enters the mouth 50 of the nozzle 14. The air flow into the mouth 50 is preferably substantially even about the bore 20 of the nozzle 14. The mouth 50 guides the air flow towards the first air outlet 44 of the nozzle 14, from where it is emitted from the humidifying apparatus 10.

The air flow emitted from the first air outlet 40 causes a secondary air flow to be generated by the entrainment of air from the external environment, specifically from the region around the first air outlet 44 and from around the rear of the nozzle 14. Some of this secondary air flow passes through the bore 20 of the nozzle 14, whereas the remainder of the secondary air flow becomes entrained within the air flow emitted from the first air outlet in front of the nozzle 14.

As mentioned above, with rotation of the impeller 76 air enters the second air passageway 64 through the inlet port 102 of the inlet duct 100 to form a second air flow. The second air flow passes through the inlet duct 100 and is emitted through the outlet port 104 over the water stored in the water reservoir 140. The emission of the second air flow from the outlet port 104 agitates the water stored in the water reservoir 140 to generate movement of water along and around the UV lamp 170, increasing the volume of water which is irradiated by the UV lamp 170. The presence of the threshold inhibitor within the stored water causes a thin layer of the threshold inhibitor to be formed on the surfaces of the tube 172 and the transducers 160 which are exposed to the stored water, inhibiting the precipitation of limescale on those surfaces. This can both prolong the working life of the transducers 160 and inhibit any degradation in the illumination of the stored water by the UV lamp 170.

In addition to the agitation of the water stored in the water reservoir 140 by the second air flow, the agitation may also be performed by the vibration of the transducers 160 in an agitation mode which is insufficient to cause atomization of the stored water. Depending, for example on the size and the number of transducers 160 of the base 56, the agitation of the stored water may be performed solely by vibration of the transducers 160 at a reduced second frequency $f_2$, and/or at a reduced amplitude, or with a different duty cycle. In this case, the drive circuit 80 may be configured to actuate the vibration of the transducers 160 in this agitation mode simultaneously with the irradiation of the stored water by the UV lamp 170.

The agitation and irradiation of the stored water continues for a period of time sufficient to reduce the level of bacteria within the water reservoir 140 by a desired amount. In this example, the water reservoir 140 has a maximum capacity of 200 ml, and the agitation and irradiation of the stored water continues for a period of 60 seconds before atomization of the stored water commences. The duration of this period of time may be lengthened or shortened depending on, for example, the degree of agitation of the stored water, the capacity of the water reservoir 140, and the intensity of the irradiation of the stored water, and so depending on these variables the duration of this period of time may take any value in the range of 10 to 300 seconds to achieve the desired reduction in the number of bacteria within the stored water.

At the end of this period of time, the drive circuit 80 actuates the vibration of the transducers 160 in the atomization mode to atomize water stored in the water reservoir 140. This creates airborne water droplets above the water located within the water reservoir 140. In the event that the stored water was agitated previously by vibration of the transducers 160 alone, the motor 78 is also activated at this end of this period of time.

As water within the water reservoir 140 is atomized, the water reservoir 140 is constantly replenished with water received from the water tank 120 via the water treatment chamber 142, so that the level of water within the water reservoir 140 remains substantially constant while the level of water within the water tank 120 gradually falls. As water enters the water reservoir 140 from the water treatment chamber 142, in which the threshold inhibitor is added to the water, it is guided by the walls 174 to flow along the tube 172 so that it is irradiated with ultraviolet radiation before it is atomized.

With rotation of the impeller 76, airborne water droplets become entrained within the second air flow emitted from the outlet port 104 of the inlet duct 100. The—now moist—second air flow passes upwardly through the outlet duct 106 of the second air passageway 64 to the second air inlet 42 of the nozzle 14, and enters the second interior passage 54 within the front section 18 of the nozzle 14.

At the base of the second interior passage 54, the second air flow is divided into two air streams which pass in opposite directions around the bore 20 of the nozzle 14. As the air streams pass through the second interior passage 54, each air stream is emitted from a respective one of the second air outlets 52 located in the front end of the nozzle 14 in front of the first air outlet 44. The emitted second air flow is conveyed away from the humidifying apparatus 10 within the air flow generated through the emission of the first air flow from the nozzle 14, thereby enabling a humid air current to be experienced rapidly at a distance of several metres from the humidifying apparatus 10.

The moist air flow is emitted from the nozzle 14 until the relative humidity $H_D$ of the air flow entering the humidifying apparatus 10, as detected by the humidity sensor 248, is 1% at 20° C. higher than the relative humidity level $H_S$, selected by the user using the third button 240*c*. The emission of the moistened air flow from the nozzle 14 may then be terminated by the drive circuit 80, preferably by changing the mode of vibration of the transducers 160. For example, the frequency of the vibration of the transducers 160 may be reduced to a frequency $f_3$, where $f_1>f_3\geq 0$, below which atomization of the stored water is not performed. Alternatively the amplitude of the vibrations of the transducers 160 may be reduced. Optionally, the motor 78 may also be stopped so that no air flow is emitted from the nozzle 14. However, when the humidity sensor 248 is located in close proximity to the motor 78 it is preferred that the motor 78 is operated continually to avoid undesirable temperature fluctuation in the local environment of the humidity sensor 248. Also, it is preferred to continue to operate the motor 78 to continue agitating the water stored in the water reservoir 140. Operation of the UV lamp 170 is also continued.

As a result of the termination of the emission of a moist air flow from the humidifying apparatus 10, the relative humidity $H_D$ detected by the humidity sensor 248 will begin to fall. Once the relative humidity of the air of the environment local to the humidity sensor 248 has fallen to 1% at 20° C. below the relative humidity level $H_S$ selected by the user, the drive circuit 80 re-activates the vibration of the transducers 160 in the atomization mode. If the motor 78 has been stopped, the drive circuit 80 simultaneously re-activates the motor 78. As before, the moist air flow is emitted from the nozzle 14 until the relative humidity $H_D$ detected by the humidity sensor 248 is 1% at 20° C. higher than the relative humidity level $H_S$ selected by the user.

This actuation sequence of the transducers 160 (and optionally the motor 78) for maintaining the detected humidity level around the level selected by the user continues until button 240*a* is actuated again, or until a signal is received from the level sensor 176 indicating that the level of water within the water reservoir 140 has fallen below the minimum level. If the button 240*a* is actuated, or upon receipt of this signal from the level sensor 176, the drive circuit 80 deactivates the motor 78, the transducers 160 and the UV lamp 170 to switch off the humidifying apparatus 10. The drive circuit 80 also deactivates these components of the humidifying apparatus 10 in response to signal received from the proximity sensor 182 indicating that the water tank 120 has been removed from the base 56.

The invention claimed is:

1. A humidifying apparatus comprising:

a housing comprising an outer wall and an inner wall connected to the outer wall by an annular wall comprising a recessed portion, wherein the outer wall, inner wall, and the recessed portion of the annular wall define a water reservoir, the recessed portion of the annular wall forms a base of the water reservoir and the outer wall and inner wall contact the base and form side walls of the water reservoir;

a water tank mounted on the housing for supplying water to the reservoir;

an air flow generator for generating an air flow over water in the reservoir;

an air outlet for emitting at least part of the air flow;

an atomizer for atomizing water in the reservoir;

an ultraviolet radiation generator for irradiating water in the reservoir with ultraviolet radiation, wherein the ultraviolet radiation generator is located at least partially within the water reservoir; and at least one guide member for guiding a flow of water entering the reservoir to flow along the ultraviolet radiation generator before being atomized by the atomizer in the same reservoir.

2. The apparatus of claim 1, wherein the at least one guide member comprises at least one baffle.

3. The apparatus of claim 1, wherein the at least one guide member is located adjacent to the irradiating device.

4. The apparatus of claim 1, comprising a chamber for conveying water from the water tank to the reservoir, and wherein the at least one guide member is located adjacent to a water outlet of the chamber.

5. The apparatus of claim 1, wherein the irradiating device comprises an ultraviolet radiation transparent tube located at least partially within the reservoir.

6. The apparatus of claim 5, wherein the at least one guide member is arranged to guide water entering the reservoir along the tube.

7. The apparatus of claim 1, wherein the atomizing device comprises a transducer, and the apparatus comprises a controller for controlling the frequency of vibration of the transducer.

8. The apparatus of claim 7, wherein the transducer is located on the opposite side of the reservoir to the irradiating device.

9. The apparatus of claim 1, comprising an inlet duct for conveying the air flow to the reservoir, and an outlet duct for conveying the air flow away from the reservoir.

10. The apparatus of claim 9, wherein the inlet duct comprises an outlet port shaped to emit the air flow in such a direction as to generate a swirling movement of the water stored in the reservoir.

11. The apparatus of claim 9, wherein the inlet duct extends along at least part of the outlet duct.

12. The apparatus of claim 9, wherein the housing comprises the inlet duct, and the water tank comprises the outlet duct.

13. The apparatus of claim 1, comprising a nozzle for receiving the air flow, the nozzle comprising said air outlet, the nozzle extending about an opening through which air from outside the apparatus is drawn by air emitted from the nozzle.

\* \* \* \* \*